US012165233B2

(12) United States Patent
Sukman et al.

(10) Patent No.: US 12,165,233 B2
(45) Date of Patent: Dec. 10, 2024

(54) MANAGEMENT SYSTEMS AND METHODS FOR CLAIM-BASED PATENT ANALYSIS

(71) Applicant: ClearstoneIP, Inc., Tucson, AZ (US)

(72) Inventors: Gabriel Sukman, Zurich (CH); Joseph Aliperti, Tucson, AZ (US); Jesse Sukman, Los Alamitos, CA (US)

(73) Assignee: ClearstoneIP, Inc., Tucson, AZ (US)

( * ) Notice: Subject to any disclaimer, the term of this patent is extended or adjusted under 35 U.S.C. 154(b) by 0 days.

(21) Appl. No.: 18/337,260

(22) Filed: Jun. 19, 2023

(65) Prior Publication Data

US 2023/0334607 A1 Oct. 19, 2023

Related U.S. Application Data

(63) Continuation of application No. 17/822,437, filed on Aug. 26, 2022, now Pat. No. 11,682,091, and a continuation of application No. 17/227,547, filed on Apr. 12, 2021, now Pat. No. 11,430,078.

(51) Int. Cl.
*G06Q 50/18* (2012.01)
*G06F 3/0482* (2013.01)
*G06F 40/169* (2020.01)
*G06F 40/30* (2020.01)

(52) U.S. Cl.
CPC ......... *G06Q 50/184* (2013.01); *G06F 3/0482* (2013.01); *G06F 40/169* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 6,449,619 B1* | 9/2002 | Colliat | ........... | G06F 16/258 |
| | | | | 707/999.102 |
| 7,716,581 B2* | 5/2010 | Tran | ........... | G06F 40/131 |
| | | | | 715/234 |
| 10,657,368 B1* | 5/2020 | Edmund | ........... | G06V 30/418 |
| 2015/0262126 A1* | 9/2015 | Gillespie | ........... | G06Q 10/10 |
| | | | | 705/342 |
| 2016/0048936 A1* | 2/2016 | Perkowski | ........... | G06Q 10/063 |
| | | | | 705/310 |

* cited by examiner

*Primary Examiner* — Tuan S Nguyen

(57) ABSTRACT

Systems, methods, and graphical user interfaces for the management and coordination of patent infringement-related analyses, such as freedom-to-operate, patent clearance, and enforcement, are provided. Patent claim information is extracted and presented to users along with purpose-specific workflows that facilitate the capture and presentation of work product on both a claim-by-claim level as well as on a document level. Integrated data management facilitates access to historical work product by interconnecting the various record entities of the system including product information, patent document information, review information, and work product information.

20 Claims, 26 Drawing Sheets

160 ──▶

230 ─┐

| Home | Home | 🔔 ❓ Hello, Gabe 👤 |
|---|---|---|
| Projects | New Patent Review | Patent Tools | Status of Active Reviews |
| Reviews 528 | | |
| Documents 232 | Assemble a list of patents and begin a claim-by-claim analysis | |
| Reports | | CLAIM CHARTS |
| Patent Finder 574 | | PATENT STATUS |
| Tools 162 ── START | | |
| Team | | |
| Account | | |
| Admin | | |
| Logout | | |

Status of Active Reviews legend:
- Clear
- Review File Wrapper
- Need Technical Info
- Further Review
- Counsel Review
- Monitor
- Invalidity Position
- Duplicate Claim
- Other
- Undetermined You have 12 active Reviews
You have 1 shared Review

Active Reviews

| | Review ID | Description | Product(s) | Due Date | Last Modified | Status |
|---|---|---|---|---|---|---|
| ◐ | REV-001 | Sample Review Creation | 550 Super (Widget) | Mar 11, 2018 | Jan 12, 2018 | In Progress |
| ◐ | SF-9600 | Review for expandable saber | Light Saber 200 (Jedi Tools) | May 6, 2017 | Jan 11, 2018 | In Progress |
| ◐ | SF-9601-A | Continuing analysis of Saber | Light Saber 200 (Jedi Tools) | Dec 30, 2017 | Jan 9, 2018 | In Progress |
| ◐ | Multi-Project Review | (none) | A200 (Widget); ... | Jun 1, 2017 | Jan 8, 2018 | In Progress |

FIG. 2

Review ID* — 170

CANCEL   NEXT

FIG. 3A

Review Description (optional) — 172

BACK   NEXT

FIG. 3B

Due Date (optional) — 174

BACK   NEXT

JEDI, INC. REVIEWS  SHARED WITH ME

FTO Reviews                                         🔔¹  ❓  Hello, Gabe 👤

[ NEW REVIEW ]

| | Review ID | Due Date | Product (Project) | Aspect(s) | Description | Date Created | Last Modified ↓ |
|---|---|---|---|---|---|---|---|
| ☐ | SF-9600 | May 6, 2017 | Light Saber 200 (Jedi Tools) | Expandable saber | Review for expandable saber concept | Jan 14, 2017 | Dec 25, 2017 |
| ☐ | Foreign Patents | Jul 29, 2017 | Radiosurgery System (Oncology Treatment); Radiotherapy System (Oncology Treatment) | (none) | Review of OUS patents | May 17, 2017 | Dec 22, 2017 |
| ☐ | SF-9601-A | Dec 30, 2017 | Light Saber 200 (Jedi Tools); New Product (Jedi Tools) | Expandable saber | Continuing analysis of Saber 200 | Nov 28, 2017 | Dec 18, 2017 |
| ☐ | Multi-Project Review | Jun 1, 2017 | A200 (Widget); 550 Super (Widget); Light Saber 200 (Jedi Tools) | Wireless Transceiver | (none) | May 8, 2017 | Oct 31, 2017 |
| ☐ | VMS-001 | Jun 2, 2017 | Radiosurgery System (Oncology Treatment); 550 Super v2 (Widget) | Beam shaping | (none) | Feb 7, 2017 | Oct 31, 2017 |
| ☐ | 9900 | N/A | Light Saber 200 (Jedi Tools) | Button actuator; Expandable saber | (none) | Jan 23, 2017 | Oct 30, 2017 |

FIG. 4

SF-9600 – Jedi Tools Light Saber 200 – Expandable saber – All Sources with 257 patents

| Pub. No ↑ | Title | Priority Date | Filing Date | Pub. Date | Assignee |
|---|---|---|---|---|---|
| US8303421B1 | Device and method for an electronic tag game | 2004-09-27 | 2008-12-15 | 2012-11-06 | FARLEY BRIAN [US] |
| US8328613B2 | GAME TOWER | 2009-11-17 | 2009-11-15 | 2012-12-11 | FILO ANDREW S [US] |
| US8402958B2 | TOY DART MAGAZINE APPARATUS | 2009-08-21 | 2009-08-21 | 2013-03-26 | VICTOR ROBERT [US] |
| US8408548B2 | Game apparatus and method of manufacturing same | 2008-12-11 | 2011-07-11 | 2013-04-02 | KELLOND PETER [GB] |
| US8469824B1 | Device and method for an electronic tag game | 2004-09-27 | 2012-07-13 | 2013-06-25 | FARLEY BRIAN [US] |
| US8485903B2 | Electronic gaming device with feedback | 1997-11-25 | 2010-12-10 | 2013-07-16 | WOOLSTON THOMAS G [US] |
| US8567377B2 | TOY PROJECTILE LAUNCHER APPARATUS | 2010-09-30 | 2011-09-27 | 2013-10-29 | VICTOR ROBERT JAMES [US] |
| US8568233B2 | Video Game Controller Attachment Apparatus | 2009-04-23 | 2010-04-23 | 2013-10-29 | BLOCK GERARD LAMBERT [US] |
| US8655622B2 | Method and apparatus for interpreting orientation invariant motion | 2008-07-05 | 2008-07-05 | 2014-02-18 | YEN WEI [US] |
| US8660303B2 | DETECTION OF BODY AND PROPS | 2009-05-01 | 2010-12-20 | 2014-02-25 | IZADI SHAHRAM [GB] |
| US8711370B1 | SCANNING OPTICAL POSITIONING SYSTEM WITH SPATIALLY TRIANGULATING RECEIVERS | 2012-10-04 | 2013-10-04 | 2014-04-29 | SMITS GERARD DIRK [US] |
| US8713016B2 | Method and apparatus for organizing segments of media assets and determining relevance of segments to a query | 2008-12-24 | 2008-12-24 | 2014-04-29 | CHIPMAN LESLIE EUGENE [US] |
| US8720897B1 | Timer controlled building and demolition game apparatus | 2012-11-16 | 2012-11-16 | 2014-05-13 | HASBRO INC [US] |
| US8747200B2 | CAPTURE GAME APPARATUS | 2011-09-27 | 2011-09-27 | 2014-06-10 | KLITSNER DAN [US] |

FIG. 7

FTO Review - SF-9600 - Jedi Tools Light Saber 200 - Expandable saber   Hello, Gabe

400

Patent Info

US8485903B2 — Electronic gaming device with feedback — 402
- Inventor(s): WOOLSTON THOMAS G [US] — 438
- Assignee: WOOLSTON THOMAS G [US] — 436
- Priority Date: 1997-11-25 — 526
- Filing Date: 2010-12-10 — 426
- Pub. Date: 2013-07-16 — 424
- Est. Expiration: 2031-06-15 — 422
- Maint. Status: Payment of Maintenance Fee, 4th Year, Large
- Status Date: 2016-12-28

Abstract Systems, methods, and apparatus for communicating information regarding movement of a gaming device are presented herein. A gaming device can include at least one sensor configured to measure information associated with at least one of a position of the gaming device or an attitude of the gaming device. Further

LOAD MORE IMAGES    UPLOAD IMAGES

< Patent 181 of 257 >

Independent Claims (0/4 Complete)

Claim 1 — 404

A method, comprising:

measuring at least one of a position of a gaming device or an attitude of the gaming device;

sending, to a controller, measurement information generated based on the at least one of the position of the gaming device or the attitude of the gaming device;

receiving, from the controller, first game information generated based on the measurement information; and toppling a gyrostat in a housing of the gaming device in response to the first game information.

Claim 9

A system, comprising:

means for generating orientation information based on at least one of a position of a gaming device or an attitude of the gaming device;

means for sending the orientation information to a controller and receiving game information from the controller, wherein the game information is based on the orientation information; and means for toppling a gyrostat located in a housing of the gaming device in response to the game information being received from the controller.

Claim 11

Determinations

Claim 1 — 406

{ — 408
- ☐ Clear
- ☐ Review File Wrapper
- ☐ Need Technical Info
- ☐ Further Review
- ☐ Counsel Review
- ☐ Monitor
- ☐ Invalidity Position
- ☐ Duplicate Claim
- ☐ Other Enter Comment                ADD COMMENT Claim 9 - undetermined — 410

Claim 11 - undetermined

Claim 13 - undetermined

Edit Claim Highlighting   ✕ based on at least one of a position of a gaming device or an attitude of the gaming device

☑ ■ ▢ ▣ ■

Enter Comment                                    ADD COMMENT

Comment Templates ▼

REMOVE HIGHLIGHTING                    CANCEL        SAVE

FIG. 9A

Edit Claim Highlighting   ✕ based on at least one of a position of a gaming device or an attitude of the gaming device

☑ ■ ▢ ▣ ■

Enter Comment                                    ADD COMMENT

⬐ 420

Comment Templates ▼

No "based on at least one of a position of a gaming device or an attitude of the gaming device"

The recited "based on at least one of a position of a gaming device or an attitude of the gaming device" is not believed to be embodied by this product as it is currently understood.

Further analysis may be necessary to determine how the recited "based on at least one of a position of a gaming device or an attitude of the gaming device" may be construed.

Further technical information may be necessary in evaluating the applicability of the recited "based on at least one of a position of a gaming device or an attitude of the gaming device".

Cancel

FTO Review - Multi-Project Review - Widget A200 et al. - Wireless Transceiver      Hello, Gabe

Patent Info

US7720001481 -- System and method for transferring duty cycle information in an isolated DC/DC converter or other circuit

| | |
|---|---|
| Inventor(s) | HAWKES CHARLES E [US] |
| Assignee | LINEAR TECHN INC [US] |
| Priority Date | 2004-11-22 |
| Filing Date | 2004-11-22 |
| Pub. Date | 2007-04-03 |
| Est. Expiration | 2025-09-21 |
| Maint. Status | Payment of Maintenance Fee, 12th Year, Large |
| Status Date | 2018-09-21 |

Abstract A signal processing methodology and circuit for supplying bias power and duty cycle information across an isolation barrier, wherein, at an input side of the isolation barrier at least one input signal carrying input duty cycle information, together with DC bias power, is received and encoded on a constant repetition rate, constant duty cycle carrier waveform. Encoding is carried out by an encoder implemented to encode the carrier waveform with a marker, such as a waveform discontinuity, at a timing corresponding to the input duty cycle information, and wherein the presence of the marker leaves the average value of the carrier waveform unaffected. At the output side of the isolation barrier, the duty cycle information may be received by a decoder, the input duty cycle information detected to reconstruct the at least one input signal, and optionally DC bias power extracted from the carrier waveform. An exemplary embodiment is based on PWM encoding and decoding of a bipolar square wave carrier waveform of constant repetition rate and duty cycle. Duty cycle Patent 17 of 73

Independent Claims (2/3 Complete)

Claim 1

A signal processing circuit for supplying duty cycle information across an isolation barrier, comprising:

on one side of the isolation barrier, an encoder circuit configured for receiving at least one duty cycle input signal containing duty cycle information, and producing a carrier signal having a waveform of generally constant repetition rate and duty cycle, in which at least a portion of the carrier signal is encoded to have a waveform marker corresponding in position to the input duty cycle information wherein the presence of the waveform marker leaves the average value of the carrier waveform substantially unaffected.

Claim 25

A method of supplying bias power and duty cycle information across an isolation barrier, comprising the step of:

at an input side of the isolation barrier, receiving an input signal having duty cycle information and producing a carrier signal having a waveform of generally constant repetition rate and duty cycle, in which a portion of the carrier signal is encoded with a signal marker corresponding in content to input duty cycle information wherein the presence of the waveform marker leaves the average duty cycle of the carrier waveform substantially unaffected.

Claim 37

A signal processing circuit in which input duty cycle information and DC bias power are transferred across an

Products (2/3 Complete)

- ▶ Project Widget
  - ☑ A200 ⎫
  - ☑ 550 Super ⎬ 444
- Project Jedi Tools
  - ☐ Light Saber 200

Determinations

Claim 1

- ☐ ● Clear
- ☐ ■ Review File Wrapper
- ☑ ▲ Need Technical Info
- ☐ ■ Further Review
- ☐ ■ Counsel Review
- ☐ ⋈ Monitor
- ☐ ⊗ Invalidity Position
- ☐ ⬚ Duplicate Claim
- ☐ ★ Other

⎱ 408

Enter Comment

_____

ADD COMMENT

448

| US7200014B1<br>Independent Claims<br>(2/3 Complete) | A200<br>First iteration of the widget | *550 Super*<br>*Supercharged*<br>*version of Widget* | Light Saber 200<br>Saber with improved<br>plasma tech |
|---|---|---|---|
| *Claim 1* | *Need Technical Info* | *Need Technical Info* | *Clear* |
| *Claim 25* | *Need Technical Info* | *Clear* | *Clear* |
| Claim 37 | Undetermined | *Counsel Review* | *Clear* |

Determination Matrix for US7200014B1

FIG. 12

Tags for US7200014B1

Use tags to add custom labels to your patents. Enter one or more tags below, separating each with a comma or carriage return. Press the keyboard down arrow to recall any previously entered tags.

tag in current review X | Add a tag

Tags in Other Reviews

Review: Multi-Project Review - Widget A200 et al. - Wireless Transceiver important reference 484      488

US7200014B1 Discussion

Jan 8, 2018 9:51 PM

Gabe Sukman
This is a comment in the current Review.

Enter Comment      ADD COMMENT

492

490

Comments in Other Reviews

Review: Multi-Project Review - Widget A200 et al. - Wireless Transceiver

May 17, 2017 9:22 AM

Gabe Sukman
Ask Larry if he's looked at this patent

| | | | Patent Finder - Global Filter | | | 🔔¹ ❓ Hello, Gabe 👤 |
|---|---|---|---|---|---|---|

QUICK LOOKUP | GLOBAL FILTER | FIND PATENTS

(Determinations: Need Technical Info) (51 results)

| | Reviews | Pub. No ↓ | Title | Priority Date | Filing Date | Pub. Date | Assignee |
|---|---|---|---|---|---|---|---|
| ☐ ⋯ | 1 | US9153074B2 | Wearable augmented reality eyeglass communication device including mobile phone and mobile computing via virtual touch screen gesture | 2011-07-18 | 2013-08-22 | 2015-10-06 | ZHOU DYLAN T X [US] |
| ☐ ⋯ | 2 | US8997727B1 | Projectile shooter toy | 2012-04-25 | 2012-04-25 | 2015-04-07 | HAMEL DANIEL ROGER [US] |
| ☐ ⋯ | 2 | US8967130B2 | Toy projectile launcher apparatus | 2010-09-26 | 2010-09-26 | 2015-03-03 | VICTOR ROBERT JAMES [US] |
| ☐ ⋯ | 2 | US8951128B1 | Device and method for an electronic tag game | 2004-09-27 | 2013-04-30 | 2015-02-10 | HASBRO INC [US] |
| ☐ ⋯ | 2 | US8920209B2 | Spinning toy apparatus | 2011-04-24 | 2012-04-19 | 2014-12-30 | BROOKS MEREDITH [US] |
| ☐ ⋯ | 2 | US8860713B2 | Controlling virtual reality | 2008-05-26 | 2009-05-26 | 2014-10-14 | KATZ SAGI [IL] |
| ☐ ⋯ | 2 | US8820305B2 | Toy projectile launcher apparatus | 2010-09-30 | 2012-06-19 | 2014-09-02 | VICTOR ROBERT JAMES [US] |
| ☐ ⋯ | 1 | US8755879B2 | Sleep tracking and waking optimization system and method therefor | 2012-10-12 | 2013-10-10 | 2014-06-17 | FORTY WINKS LLC [US] |
| ☐ ⋯ | 2 | US8747200B2 | Capture game apparatus | 2011-09-27 | 2011-09-27 | 2014-06-10 | KLITSNER DAN [US] |
| ☐ ⋯ | 2 | US8655622B2 | Method and apparatus for interpreting orientation invariant motion | 2008-07-05 | 2008-07-05 | 2014-02-18 | YEN WEI [US] |
| ☐ ⋯ | 2 | US8567377B2 | Toy projectile launcher apparatus | 2010-09-30 | 2011-09-27 | 2013-10-29 | VICTOR ROBERT JAMES [US] |
| ☐ ⋯ | 2 | US7657304B2 | Imaging device for radiation treatment applications | 2002-10-05 | 2002-10-05 | 2010-02-02 | VARIAN MED SYS INC [US] |

| | | Jedi Tools | | | | | | | 🔔¹ ⑦ Hello, Gabe 👤 |
|---|---|---|---|---|---|---|---|---|---|
| | OVERVIEW | DOCUMENTS | REVIEWS | | | | | | |
| PROJECTS | Review ID | Due Date | Product (Project) | Aspect(s) | Description | Date Created | Last Modified | Analyst(s) | Attorney | Status | Progress |
| Brain-computer interface ⟩ | | | | | | | | | | |
| Consumer Products ⟩ | | | | | | | | | | |
| Ingredient A ⟨ | SF-9600 | May 6, 2017 | Light Saber 200 (Jedi Tools) | Expandable saber | Review for expandable saber concept | Jan 14, 2017 | Dec 25, 2017 | Mace Windu | Gabe Sukman | In Progress | ◕ |
| ● Jedi Tools ⟨ | SF-9601-A | Dec 30, 2017 | Light Saber 200 (Jedi Tools); New Product (Jedi Tools) | Expandable saber | Continuing analysis of Saber 200 | Nov 28, 2017 | Dec 18, 2017 | Mace Windu | Gabe Sukman | In Progress | ◕ |
|   Light Saber 200 | Multi-Project Review | Jun 1, 2017 | A200 (Widget); 550 Super (Widget); Light Saber 200 (Jedi Tools) | Wireless Transceiver | (none) | May 8, 2017 | Oct 31, 2017 | Mace Windu; Obi-Wan Kenobi | Gabe Sukman | In Progress | ◕ |
|   New Product | | | | | | | | | | |
| Oncology Treatment ⟩ | 9900 | N/A | Light Saber 200 (Jedi Tools) | Button actuator; Expandable saber | (none) | Jan 23, 2017 | Oct 30, 2017 | Leia Organa | Yoda | In Progress | ◕ |
| Real-time Tracking ⟩ | | | | | | | | | | |
| Widget ⟩ | | | | | | | | | | |

| | | Jedi Tools - Light Saber 200 | | 🔔¹ ❓ 👤 Hello, Gabe |
|---|---|---|---|---|
| Home | — | | | |
| Projects | PROJECTS | + | OVERVIEW  ASPECTS  DOCUMENTS  REVIEWS | |
| Reviews | Brain-computer interface > | | • Button actuator | Button actuator    ⋯ |
| Documents | Consumer Products > | | Expandable saber | Description  N/A |
| Reports | Ingredient A < | | | First Release  N/A  ⟵ 566 |
| Patent Finder | Jedi Tools ⌄ | | Add an aspect | Products  ( Light Saber 200 (Je... ) |
| Tools | • Light Saber 200 | | | Web Link  N/A |
| Team | New Product > | | | Status  Active |
| Account | Oncology Treatment > | | | 558 |
| Admin | Real-time Tracking > | | 560 ⟶ ✏️ | |
| Logout | Widget | | CHANGE IMAGE | |
| | | | | 562 ⟶ DOCUMENTS  COMMENTS |
| | | | | ⟵ 564 |
| | | | | [ UPLOAD FILES ] |
| | | | | No documents yet |

FIG. 16D

Product Management    🔔¹ ? Hello, Gabe 👤

568 ⤵

| | | |
|---|---|---|
| Home | | |
| Projects | NEW PROJECT  🔍 Find   in: All ▼  👁 View by: Projects ▼ | |
| Reviews | | |
| Documents | | |
| Reports | | |
| Patent Finder | | |
| Tools | | |
| Team | | |
| Account | | |
| Admin | | |
| Logout | | |

570 ⤵

| Project Name ↑ | Description | Due Date | Date Created | Analyst(s) | Attorney |
|---|---|---|---|---|---|
| ˅ Brain-computer interface  📄 Products (1) Reviews (2) | Something | --- | Mar 24, 2017 | Lando | Leia |
| ˅ Consumer Products  📄 Products (1) Reviews (1) | Products | Jun 23, 2017 | Jun 23, 2017 | Mace; Han | Gabe |
| ˄ Jedi Tools  📄 Products Reviews (4) | Products relating to Jedi tools of the trade | Jul 14, 2017 | Jan 14, 2017 | Obi-Wan | Leia |

| | Product Name | Description | Due Date | Date Created | Analyst(s) | Aspects | Reviews |
|---|---|---|---|---|---|---|---|
| ⋮ 📄 | Blaster | Ray gun device including pew functionality | --- | Sep 18, 2017 | Obi-Wan | --- | 1 Review |
| ⋮ 📄 | Light Saber 200 | Saber with improved plasma tech | --- | Jan 14, 2017 | Mace | 2 Aspects | 4 Reviews |

| Project Name | Description | Due Date | Date Created | Analyst(s) | Attorney |
|---|---|---|---|---|---|
| ˅ Oncology Treatment  📄 Products (2) Reviews (3) | --- | --- | Aug 31, 2017 | Feb 7, 2017 | --- |
| ˅ Real-time Tracking  📄 Products (2) No Reviews | --- | --- | --- | Feb 7, 2017 | --- |
| ˅ Widget  📄 Products (3) Reviews | Project includes all widget product models | Aug 25, 2017 | Jan 10, 2017 | Lando | Leia |

| | Review ID | Description | Due Date | Products | Aspects | Analyst(s) | Attorney | Status |
|---|---|---|---|---|---|---|---|---|
| ⋮ 📄 | Multi-Project Review | --- | Jun 1, 2017 | 2 Products | 1 Aspect | Mace; Obi-Wan | Gabe | In Progress |
| ⋮ 📄 | VMS-001 | --- | Jun 2, 2017 | 2 Products | 1 Aspect | Han | Leia | In Progress |
| ⋮ 📄 | Codec 1000 | --- | --- | 1 Product | --- | --- | Gabe | In Progress |

FIG. 17

MANAGEMENT SYSTEMS AND METHODS FOR CLAIM-BASED PATENT ANALYSIS

CROSS-REFERENCE TO RELATED APPLICATIONS

This application is a continuation of U.S. patent application Ser. No. 17/822,437, filed on Aug. 26, 2022, which is a continuation of U.S. patent application Ser. No. 17/227,547, filed on Apr. 12, 2021, which is a continuation of U.S. patent application Ser. No. 16/247,537, filed on Jan. 14, 2019, which claims the benefit of the filing date of U.S. Provisional Patent Application No. 62/617,167, filed on Jan. 12, 2018, each of which is hereby expressly incorporated by reference in their entirety.

FIELD OF THE INVENTION

This invention pertains to the field of patent analysis and, more particularly, to methods and systems for facilitating the efficient review of patent documents and managing work product created through such processes.

BACKGROUND

Freedom-to-operate (FTO) and patent clearance analysis are important tasks to be performed by participants of most commercial industries. Without mitigating the risk of patent infringement by routinely assessing FTO for products they place on the market, companies may be found liable for significant damages. When patent infringement is deemed "willful," the damages can be enhanced by courts by as much as three times the base amount, resulting in significant liability in many cases.

Conventional means for assessing and managing FTO and patent clearance activities typically involve storing work product and analysis in spreadsheets or other generic discrete documents that are not purpose-built for the task. Work product is often difficult to find due to versioning issues, consistency in storage locations, and employee turnover resulting in lost institutional knowledge. There is little transparency in the process for these reasons, which negatively affects the ability for legal departments to adequately collaborate with product development teams. This lack of collaboration can substantially prolong time-to-market for products because of the inability to timely deliver and respond to patent risk assessments.

BRIEF SUMMARY

Embodiments of the present invention are described herein that provide significant advantages over conventional systems by creating a central repository, novel workflows, increased collaborative capabilities, enhanced transparency, and ease-of-use for all FTO, patent clearance, or other infringement-based analyses. As a result, systems in accordance with embodiments of the present invention will enable legal analysts and product developers to work together in mitigating patent risk more efficiently in order to reduce the time it takes to bring products to market and, ultimately, accelerate the innovation process.

BRIEF DESCRIPTION OF THE DRAWINGS

FIG. 2 illustrates a user interface in accordance with one example embodiment.

FIGS. 3A-3J illustrate user interfaces in accordance with example embodiments.

FIG. 4 illustrates a user interface in accordance with one example embodiment.

FIG. 7 illustrates a user interface in accordance with one example embodiment.

FIGS. 8A-8B illustrate user interfaces in accordance with example embodiments.

FIGS. 9A-9B illustrate user interfaces in accordance with example embodiments.

FIGS. 11A-11B illustrate user interfaces in accordance with example embodiments.

FIG. 12 illustrates a user interface in accordance with one example embodiment.

FIGS. 13A-13B illustrate user interfaces in accordance with example embodiments.

FIG. 15 illustrates a user interface in accordance with one example embodiment.

FIGS. 16A-16D illustrate user interfaces in accordance with example embodiments.

FIG. 17 illustrates a user interface in accordance with one example embodiment.

Figure 1:
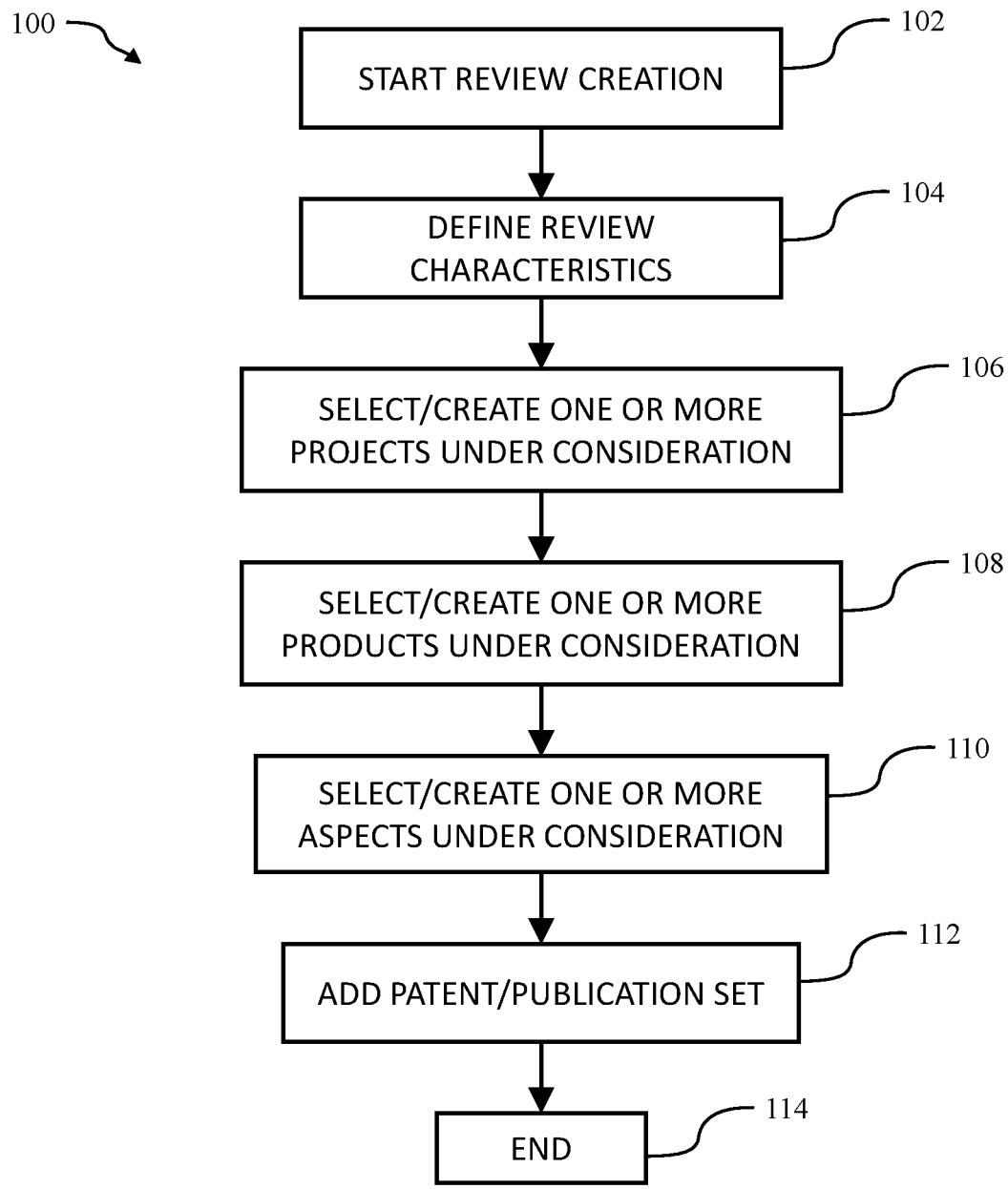
FIG. 1 is a method flow diagram in accordance with one example embodiment.

The drawings described herein are for illustrative purposes only and are not intended to limit the scope of the present invention in any way. Exemplary implementations will now be described with reference to the accompanying drawings.

DETAILED DESCRIPTION

Various aspects of the methods and systems of the present invention disclosed herein, along with the accompanying drawings referenced herein, are intended to be exemplary and not limiting. It is understood that other embodiments may be utilized and fall within the scope of the appended claims without departing from the spirit of the invention.

Certain types of patent analysis are conducted with respect to a particular product, system, or process in order to determine whether that product, system, or process is within the scope of any claims of a set of patents. Non-exclusive examples of these types of analyses may be referred to as infringement studies, freedom-to-operate analysis, clearance, licensing assessment, enforcement analysis, diligence, etc. Other types of analysis are primarily directed to whether the subject matter of an issued or pending patent claim is disclosed, taught, or suggested by the prior art. These types of analyses are generally referred to as invalidity, prior art, or patentability investigations.

In accordance with embodiments of the present invention, systems and methods are provided that enhance the speed, accuracy, and efficiency of all sorts of patent analysis. The present invention is implemented on a computer or electronic terminal. The computer is able to communicate either directly or indirectly (using intermediate devices) with an application client to receive and transmit information. It is envisioned that the system of the present invention can be implemented on any existing or future terminal or device with the processing capability to perform the functions described herein. The scope of the present invention is not limited by the type of terminal or device used. Further, the specification may refer to a click of a mouse or a keyboard entry as a means for user input and interaction with the terminal display as an example of an action of the user. While this describes a preferred mode of interaction, the scope of the present invention is not limited to the use of a mouse or keyboard as the input device or to the click of a mouse button as the user's action. Rather, any action by a user within a short period of time, whether comprising one or more clicks of a mouse button or other input device, is considered an action of the user for the purposes of the present invention.

In accordance with the present invention, a particular collection of data may be created as a fundamental commodity of a patent analysis process described herein. This collection of data will be referred to herein as a "patent review" or simply "review." In embodiments of the invention, a review may comprise an integrated collection of data including, inter alia: (a) review characteristics/metadata; (b) product information; (c) one or more patent publications; and (d) user work product.

A process 100 for creating a review using a system in accordance with the present invention is shown in FIG. 1. The process 100 may be carried out by means of a software application installed on a user terminal that includes at least one user input device, a central processing unit, and a display device configured to display a graphical user interface. The user terminal may be a personal computer, mobile device, tablet, or any other suitable device. In preferred embodiments the user terminal is configured to access a web-based application configured to implement systems and methods of the present invention via the internet. However, an application that is locally stored on a user terminal is also within the scope of the present invention.

FIG. 2 represents a homepage or dashboard page of an application utilizing systems and methods of the present invention. From this page, a user may access one of several different functionalities and tools.

Referring to FIGS. 1 and 2, in step 102, a user initiates a review creation process by, for example, clicking on a button in a graphical user interface displayed on a user terminal, such as clicking start button 162 in FIG. 2. Then, in step 104, the user interface prompts the user to enter various information or characteristics for purposes of administrative management of the review. In step 106, the user may create a project record or select a project from a list of previously created projects. In step 108, the user may similarly create a new product record or select a product from a list of previously created products. In step 110, the user may similarly create a new aspect record or select an aspect from a list of previously created aspects. Each of steps 106, 108, and 110 are optional, although in preferred embodiments at least one of these steps is performed. In step 112, the user may add one or more patent publications by either copying and pasting a list of document identifiers (such as publication numbers), by performing a search, or by any other means of importing publications into the application. The review creation process ends at step 114. At the completion of the review creation process 100, the information provided by the user is stored in one or more databases and functionally inter-related (e.g., by means of data tables) so as to form a "review" entity in accordance with the present invention.

Each of the above review creation steps will be described in greater detail below. Then, various advantageous functionality, systems, and methods utilizing the review records will be described. Finally, a computing system and network architecture suitable for use for the present invention will be described.

Figure 3D:
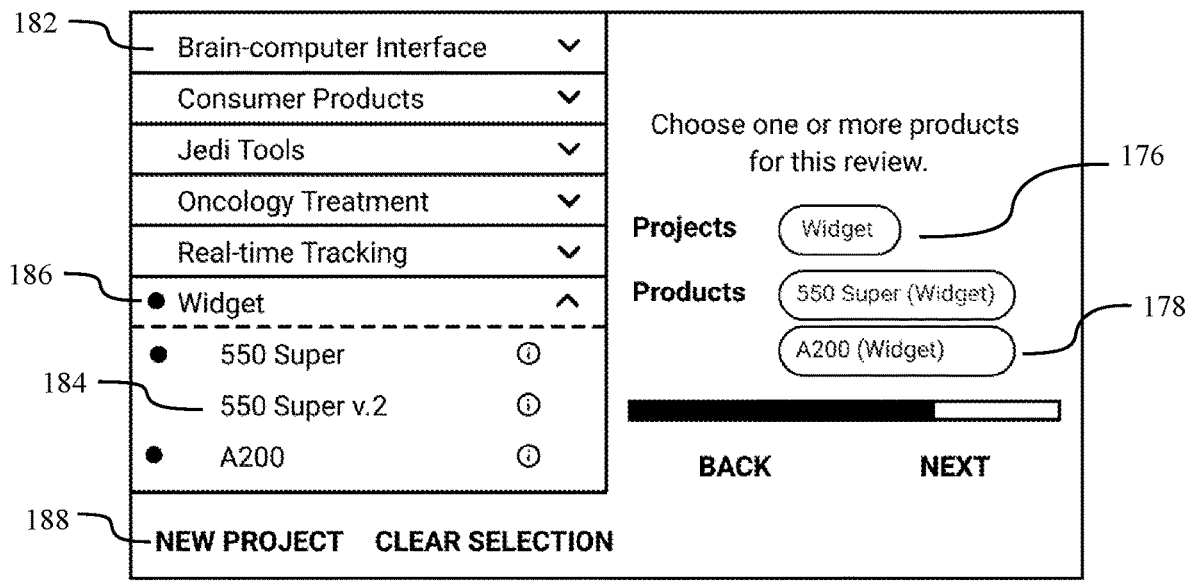

The review creation process may be initiated by the user clicking on a designated portion of a graphical user interface displayed on a user terminal, such as a button indicating "New Review" or the like. Then, the user defines review characteristics in step 104. FIGS. 3A-3J illustrate user interfaces as part of an example flow process that may be provided by a computer program to allow the user to provide various characteristics to describe the review. In FIG. 3A, the flow prompts the user to enter a review identifier, or "Review ID" 170. FIG. 3B illustrates a prompt that allows the user to enter a description 172 for the review, and FIG. 3C allows the user to enter a due date 174 for the review. Additional information may be recorded as review characteristics in accordance with the present invention.

Figure 3E:
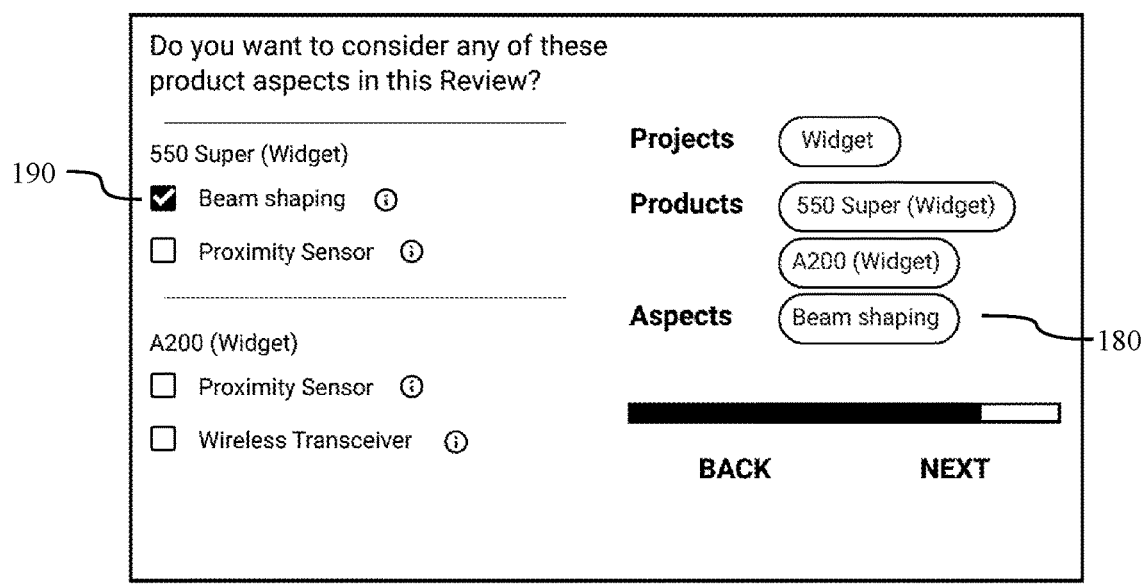

Next, in steps 106, 108, and 110, the computer program may be configured to prompt the user to create or select projects 176, products 178, or aspects 180 as shown in FIGS. 3D and 3E. As used herein, "projects," "products," and "aspects" are hierarchical descriptors used to describe particular products, systems, methods, devices, apparatuses, etc. that are intended to be the subject of one or more patent reviews. Here, "aspects" are considered a divided portion of a "product," which is considered a divided portion of a "project." Stated differently, "projects" are the highest level of organization and contain "products." "Products" are the second highest level of organization and may contain "aspects."

For example, a user may be using the present invention to facilitate a freedom-to-operate analysis for a particular product that is intended to be placed on the market. Thus, the user may create a "product" record for the product that is under consideration. If the product is part of a line of similar products, then they may be grouped as part of a broader "project" category. In the other direction, if the product includes several discrete components or features that may be the subject of a limited freedom-to-operate investigation, then the user may wish to create an "aspect" record for each discrete feature that may be the subject of a review. Thus, in steps 106, 108, and 110, the point is that the user may associate one or more "projects," one or more "products," or one or more "aspects" with a particular review in order to define the subject of the analysis.

It should be noted, however, that the "project," "product," and "aspect" descriptors are not intended to be limiting insofar as whether a particular concept or article is one or the other. These terms are primarily used for organizational purposes. Thus, it is not necessary that a "product" as used herein or in an embodying computer application be representative of an actual product. "Product" can refer to an idea, concept, old technology, future technology, patent claims, pending claims, or any other subject matter under consideration in relation to patents. Further "product" may refer to an entire device or system, part of a device or system, or several devices or systems treated as one.

FIG. 3D further illustrates a prompt that is configured to receive input from a user to associate projects and products with a review. The left side of the window includes a listing 182 of projects that have been previously saved in the system. Each of the projects are expandable to display nested products 184 by, for example, clicking on the down arrow at the right of each project row. To designate a project or product as subject matter of a review, the user can simply click the row of the selected project or product. An indicator may be applied to the selected projects and products, shown here as a circle 186, to provide a visual indication of the selections. The names of selected projects 176 and products 178 may alternatively or additionally be displayed separately from the list, shown here as part of the right-hand portion of the user interface.

If a user wishes to associate a new project to a review (i.e., a project that is not already listed), the user may select a new project button 188. The user will then be prompted to provide a name for the new project, which will subsequently be listed among the other projects. A further user option may be provided to add a new product to either existing projects or newly added projects. For example, although not shown, each of the listed projects may have a menu button associated therewith that provides an option to add a new product under the project. Upon clicking a new product option, the user will then be prompted to provide a name for the new product, which will subsequently be displayed in the listing under the selected project.

After selecting projects and/or products, the user may be presented with a prompt such as that shown in FIG. 3E in order to select particular aspects under consideration. In some embodiments, aspect listing 190 is based on the projects or products that were selected in the previous step. That is, the aspect listing 190 may show only aspects that are associated with the selected projects and products. This restriction helps to ensure that an analyst is cognizant of the product that contains a selected aspect because in some patent analysis activities, such as freedom-to-operate, it may be improper to consider a part of a product without considering the whole. The prompt shown in FIG. 3E may also include functionality to add new aspects to products, similar to that described above regarding adding new projects and products.

The interfaces shown in FIGS. 3D-3E is only exemplary of a mechanism to receive the product-related components of a review from a user. One of skill in the art will recognize that a great variety of interfaces may be used to capture project, product, and aspect information from a user without departing from the spirit of the invention.

FIGS. 3F-3I illustrate graphical user interface prompts configured to receive publications from a user in furtherance of step 112 of the review creation process 100. In accordance with the present invention and as described herein, the terms "publication" and "publication identifier" may be used interchangeably. Likewise, the terms "patent" and "patent identifier" may be used interchangeably. As such, when this disclosure refers to receiving "publications" from a user, it may include the user simply entering publication numbers into an interface. This is all that is needed in order perform the necessary processing since the application has access to worldwide collections of patent data and can preferably retrieve content, bibliographic data, and any other publication information on demand as long as it has identifying information such as a publication number (which may include other indicia such as a country code and/or kind code). Other identifying information may include application number, priority number, family identifier, docket number, or any other information.

In addition, as used herein, the term "patent," "patent document," or "patent publication" may refer to actually granted patents, whether active, expired, or withdrawn, as well as patent applications, which may or may not have actually been granted or published. All of these documents are collectively referred to as "patent documents," "patent publications," or simply "publications."

Figure 3F:
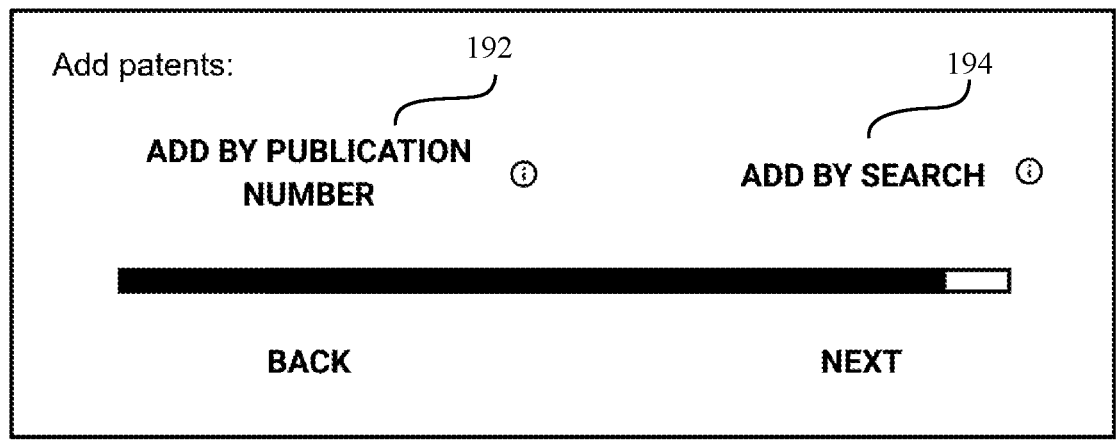

FIG. 3F illustrates a user interface that provides two ways for a user to enter publications in order to associate them with a review: (a) adding by publication number 192; and (b) adding using a search function 194. Other ways to add publications to a review may include importing a list from a file or establishing a direct connection with another application by means of an API (application program interface) or other application-to-application integration.

Figure 3G:
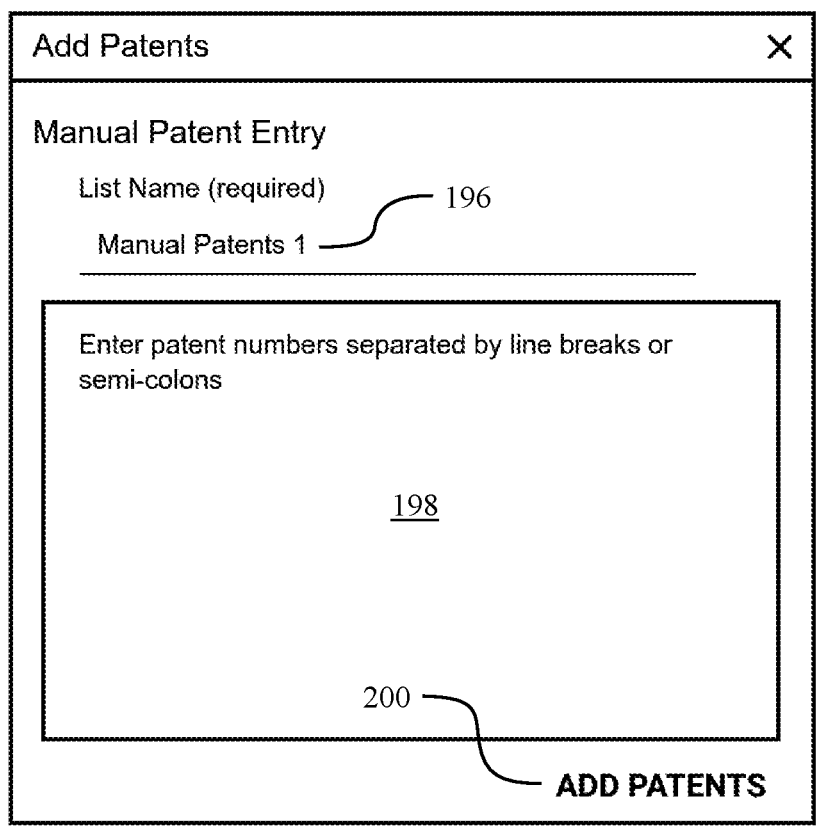
Figure 3H:

When a user selects the Add By Publication Number button 192, a further window may be displayed as shown in FIG. 3G. This window includes two fields: a list name field 196 and a publication entry field 198. The list name field 196 may be pre-populated with a default list name, such as Manual Patents 1 (which can be automatically incremented based on the number of lists that have already been added). The user may keep the default name or enter a new name by clicking on the list name field 196 and typing in a new name.

To add publications, a user may simply type the publication numbers into the field 198. This may be accomplished by either manually typing each of the numbers or by copying a list of numbers from an external source and pasting them into the field 198. The application may allow for an unlimited number of publication numbers, or may impose limits in order to reduce processing burdens. The system is preferably configured to be able to receive patent publication numbers from all available patent jurisdictions. To this end, publication numbers generally follow prescribed nomenclature such as [CC][PUB. NO.][KC], where [CC] represents a country code, [PUB. NO.] represents the publication number, which typically follows a serial progression, and [KC] represents a publication kind code, which is typically a code that represents a type of publication (e.g., published application or published grant). Once user has entered all desired publication numbers, they may click a button 200 to submit the request and thereby add the patents to the review.

If a user wishes to add patents to a review using a search function, they may select the add-by-search button 194 shown in FIG. 3F. The user may then be presented with a window such as that shown in FIG. 3H. This window represents a basic Boolean operator based search function. Keywords, terms, and operators may be entered into field 202. Table 204 lists a number of available search fields that can be used to refine a search. For example, if a user uses the field code "TTL/" as shown, then the subsequent terms will be searched only in the patent title field. The user may select one or more databases from which to search patent publications including, for example, US granted patents (US-PAT), US published patent applications (USAPP), World Intellectual Property Organization publications (WIPO), Japan Patent Office publications (JP), or European Patent Office publications (EP). These databases are just examples of available databases. The present invention preferably includes as many international patent jurisdictions as feasible in order to maximize scope and comprehensiveness. To the extent that additional jurisdictions are available, database selectors 206 may allow a user to select one or more of such jurisdictions depending on the particular needs of the user and the task at hand.

Limit field 208 may represent a maximum number of publications that are to be returned by search. This limit can be set by the user or can be imposed by the system. For example, if a user knows that they will not have time to review more than 1,000 publications, they can set the limit at 1,000 in order to limit processing time. The user may then re-structure a search query in order to yield a set of results that is less than the maximum. Since the search function requires processing power, the system may impose automatic default limits to ensure that system resources will not be encumbered.

After entering a search query in field 202 and clicking a submit button 210, the number of hit results may be indicated by count 212. If the user is satisfied with the search they may add the results to the review by clicking the Add To Review button. Although not shown, the user may be given an opportunity to provide a name to the list of patents that are added by using the search functionality.

Figure 3I:

FIG. 3I shows the "add publications" interface after a list of publications has been added by publication number 214 and a further list of publications has been added by search 216. Each of these lists may be referred to as "sources" as shown in the figure. A source may be removed by clicking on a close button 218 or by similar action.

Figure 3J:
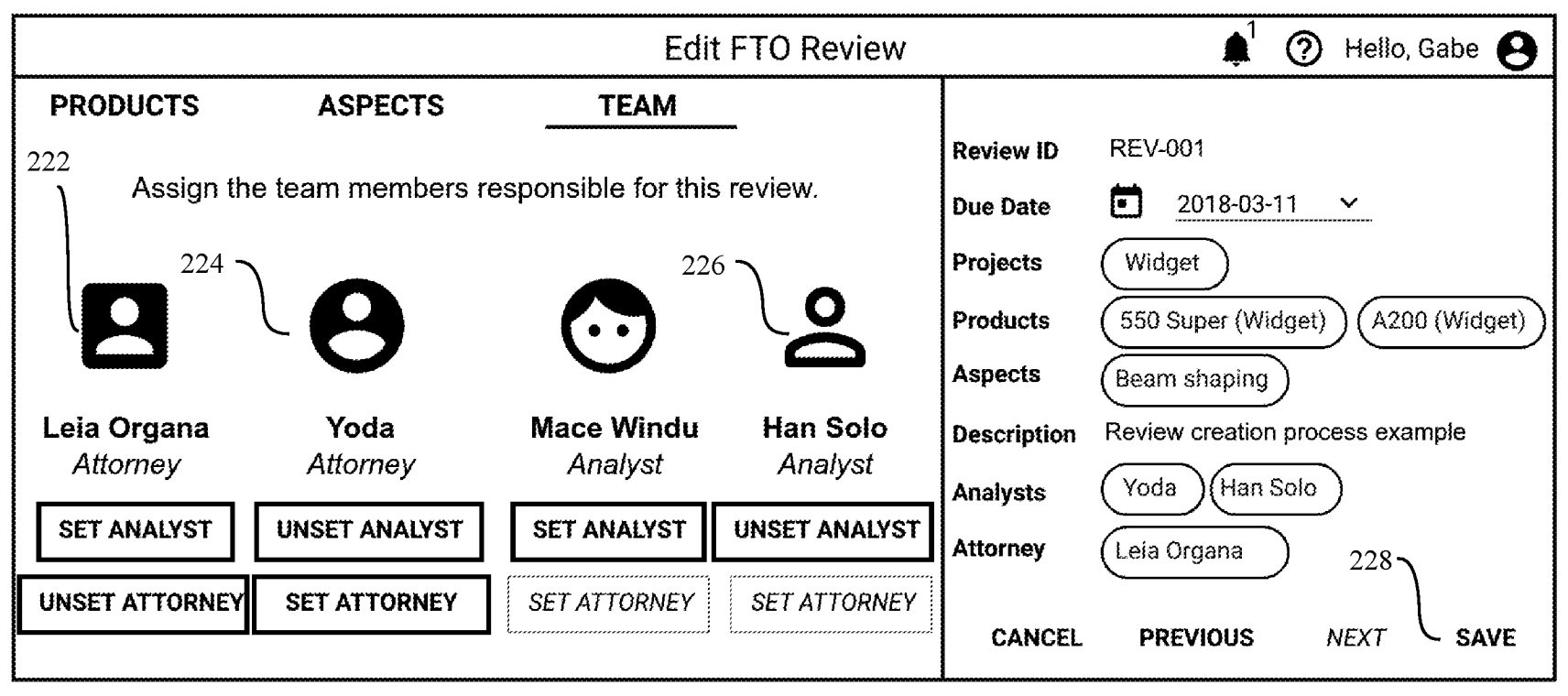
Figure 6:
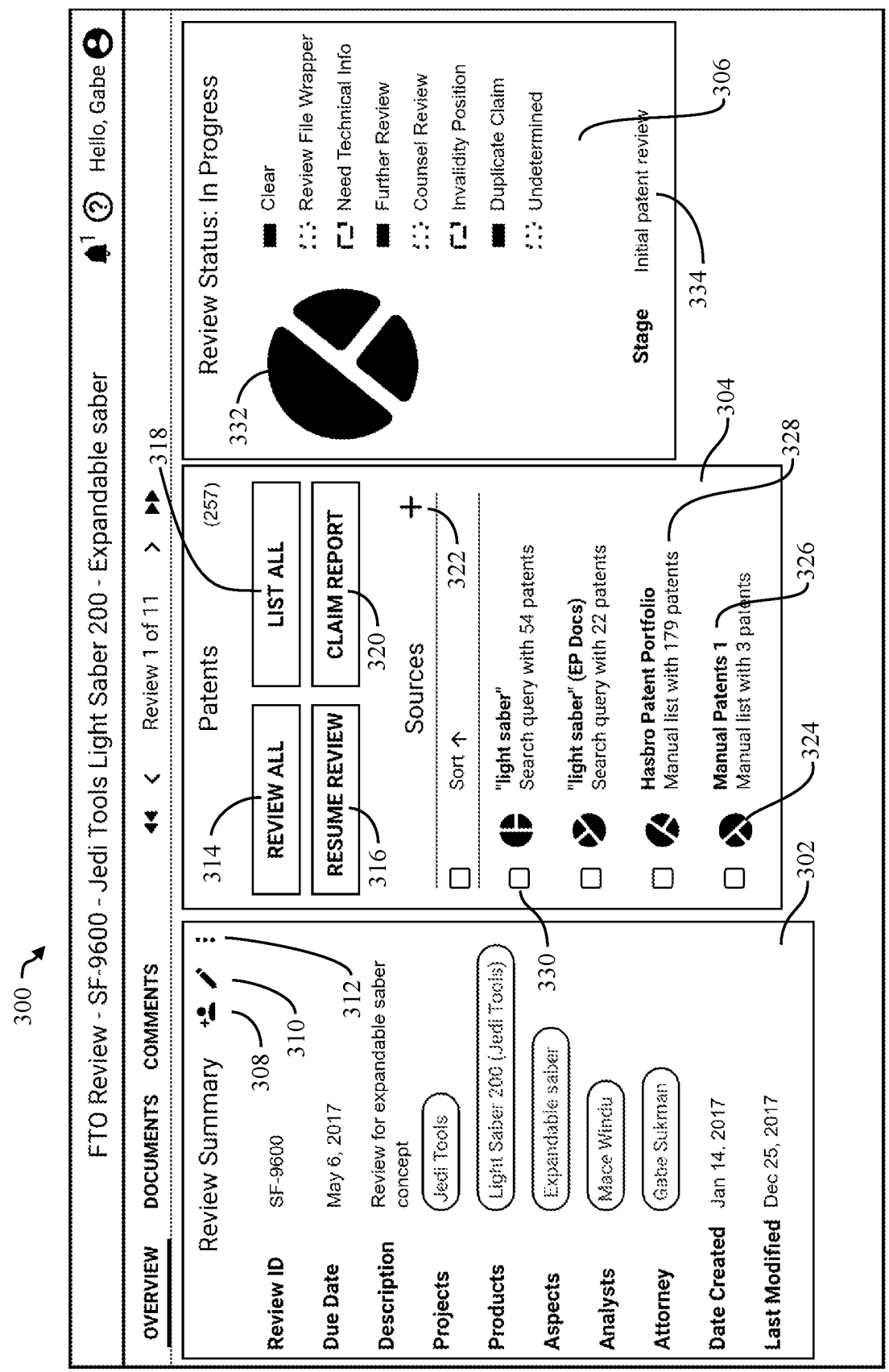
FIG. 6 illustrates a user interface in accordance with one example embodiment.

The user may then click a button 220 to advance to the next step in the review creation process. In some embodiments, the review creation process is complete and clicking the button 220 completes the process. Other embodiments may include further steps, such as assigning team members to the review and designating their roles, setting access rights for the review, or providing any other desired information. If the next step includes assigning team members, the user may be presented with a further interface, as shown in FIG. 3J, that lists the members of the team. The user may select one or more of the listed members to associate them with the review. In some cases, it may be desirable to assign specific roles to team members. For example, if a member of the team is an attorney then that member may be assigned an "attorney" role in the context of the review. FIG. 3J shows the user Leia Organa 222 as a designated attorney and the users Yoda 224 and Han Solo 226 as designated analysts. By designating at least one attorney to a review and maintaining appropriate usage policies, a system in accordance with the present invention may have further advantages by helping to preserve attorney-client privilege, attorney work product, or other protections for communications, documents, and other information entered into the system. Clicking a button 228, indicated for example as "save," "start review," or the like may then complete the review creation process. The user may then be presented with a review summary interface as shown in FIG. 6, which will be described further below.

Reviews Interface

Referring again to FIG. 2, navigation bar 230 includes various access points to different modules within a system in accordance with the present invention. Navigation bar may be available as a persistent display in any interface of the system, or it may be optionally hidden and accessible by clicking a menu button or equivalent.

A user may access a listing of reviews by clicking button 232 in navigation bar 230. This action will result in the display of a review list interface 234 such as that shown in FIG. 4. The reviews shown in list 234 are generated by querying a database for all reviews for which the requesting user has access. The user may have access by virtue of having created a review, being on a team that shares reviews across the team, or has been specifically designated as a recipient by another user. Other ways to share access to reviews are described further below.

The review listing may include information relating to each of several reviews, where each review is listed in a separate row. For example, the review listing may indicate a review progress 236 (indicated by a pie chart, for example), the review ID 238, due date 240, associated projects and products 242, associated aspects 244, description 246, date created 248, date modified 250, assigned analysts (not shown), and/or assigned attorneys (not shown).

Each of the rows in listing 234 may have a selection box 252 that allows a user to select one or more rows upon which to perform an action. When one or more selection boxes 252 are selected, an action menu may appear that includes options such as copy, delete, edit, share, archive, etc. When a user selects one of these actions, the selected action will be performed on the one or more selected reviews.

Figure 5:
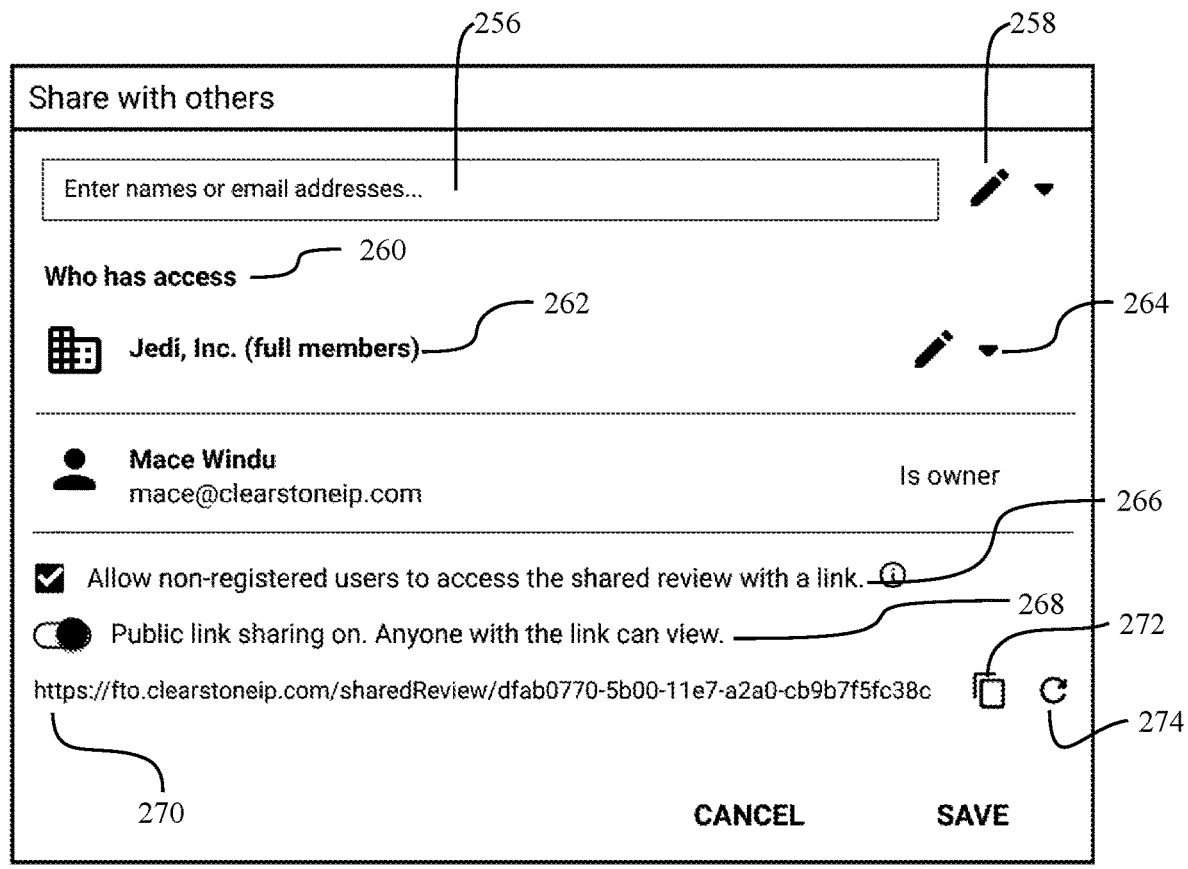
FIG. 5 illustrates a user interface in accordance with one example embodiment.

The review row may also include an icon 254 that represents initiation of a sharing function. FIG. 5 illustrates a user interface configured to allow a user to share reviews with others. In the field 256, a user may enter an email address for an individual with whom the user would like to share the review. The user may select access rights using the dropdown menu 258 or other mechanism in order to delegate appropriate rights as desired. Such rights may include full edit/modification rights, read only, commenting only, determinations only, tagging only, or combinations thereof. Once the share recipient is entered, the recipient is listed among those who have access to the review in list 260.

A user may alternatively enter simply a name of an individual with whom they would like to share the review. If the intended share recipient is already a member of the user's team, then the system may automatically present an identification of a matching team member. The user may then select the team member to add to a list 260 of individuals who have access to the review.

Access rights may also be controlled by organization. As shown in FIG. 5, an organization 262 is shown as having access rights to the review. The user may click on dropdown menu 264 to change the access rights permitted to members of the organization. Individual access rights may be configured to override organization access rights. For example, if the user Mace Windu is a member of the organization Jedi Inc., and Jedi Inc. is only permitted read access to a review, the owner of the review may give Mace Windu additional rights, such as editing rights, by specifically entering Mace Windu's name in the field 256 and assigning the desired level of access using the menu 258.

A user may decide whether it is desired to allow unregistered users to view a review or whether only registered, logged-in users may view and/or edit a shared review. For this purpose, an option 266 may be provided that allows the application to send a public URL address to an intended share recipient. Language such as that shown, for example "Allow non-registered users to access the shared review with a link," may be used to present this option to the user. If the option is selected, then the application will generate a link and send it to an email address that is associated with the intended share recipient (whether entered by the user or previously stored in the system). Either the intended recipient or anyone who receives the link can then access the review. Alternatively, if the information contained in the review is particularly sensitive and the user desires that only registered, logged-in users have access, then the user may uncheck the box 266. In this case, the system will generate a link that directs to an internet destination that can only be accessed by the intended recipient upon logging into the system with personalized credentials.

An application utilizing systems and methods in accordance with the present invention maintains a registered user database in order to facilitate effective and appropriate handling of review sharing capabilities. For example, a user may not know whether an intended share recipient is a registered user of the application. In this case, the system may look up the email address entered by the user in the registered user database and determine whether a generated link should be publicly accessible (if the share recipient is unregistered the user selects the box 266) or a generated link should be accessible only by the intended recipient (if the share recipient is registered).

If the option 266 is not selected, then the system will look up the entered email address of the intended recipient in the registered user database and, if the recipient is a registered user, send a private link to the recipient that requires the recipient to log into the system in order to access the shared review. If the option 266 is not selected and the intended recipient is not a registered user, then the system may send a message to the email address of the intended recipient (as entered by the user) that notifies the recipient that a review has been shared with them and may be accessed by registering with the system. Once the recipient has registered with the system, they may then be given access to the review shared by the original user.

A user may also wish to share a review with one or more unspecified users. For that purpose, the user may select the public link sharing option 268 in order to generate a public link. Upon selecting the option 268, the system will display a URL 270 that the user can copy and paste in another location. Copy button 272 may be provided for convenience. The user may also generate a new public link (which may optionally destroy a previous public link) by clicking a link refresh button 274.

When a user is a recipient of a review shared by another user, the review may be listed separately from reviews that were created by the user. For example, as shown in FIG. 4, the active tab shows reviews created natively by the user. The active tab may also show all reviews that were created by members of the user's team or organization. The interface may include a further tab or link 276 to view shared reviews. By clicking the shared review link 276, a user may view a listing of all reviews for which they have been granted access by another user. Although not shown, the shared review link may include similar information for shared reviews as shown for native reviews in FIG. 4.

Review Summary

Referring again to FIG. 4, a user may enter a review record by selecting one of the listed reviews. This may be achieved by simply clicking on a location in the row of the desired review or by any other similar selection means. The interface may then present a review summary interface 300, as shown in FIG. 6.

The information displayed in interface 300 reflects the information gathered during the review creation process discussed above as well as subsequent user work product. The left-hand pane 302 displays a review summary that may include information such as review ID, due date, description, associated projects, products, and aspects, analysts, attorneys, date created, and/or date last modified. The review summary pane may also include access to functions such as sharing, editing, and a further menu, such as by means of share icon 308, edit icon 310, and menu button 312.

The sharing function 308 may be equivalent to that described above with respect to function 254 in FIGS. 4 and 5. The editing function 310 may allow a user to re-enter the review creation flow process described above with respect to FIGS. 3A-3J. The menu function 312 may provide access to further functionality such as copying or deleting the review. It should be appreciated that the specific location of each of these functions is not critical. For example, instead of the sharing and editing functions being readily accessible via dedicated buttons, those functions may alternatively by provided in menu 312. Likewise, the menu can be removed so that all functions are available through dedicated buttons.

The central pane 304 may display various records and functionality pertaining to the publications that have been added to the review. Review All button 314 may allow a user to initiate a review of all added publications starting with a first publication based on a predetermined sorting order (further described below). Resume button 316 may allow a user to re-enter a publication review that has already been started. For example, upon clicking the resume button 316, the system may query all publications that have been added to the review and which include at least one claim for which no determination has been made (claim determinations are discussed further below) and present to the user the first publication among that set. List button 318 may present to the user a listed view of all publications that have been entered into the review (discussed further below). Report button 320 may initiate the automatic generation of an exportable document that includes publication data along with work produced entered through the system. The report may be formatted as a word processing document or as a spreadsheet, and preferably has options to include publication bibliographic data, claim text, expiration data, as well as user work product such as publication tags and comments and claim determinations, comments and highlighting.

Central pane 304 may also include a list of publication sources that have been added to the review. These sources can be the result of manual addition of publication numbers or by searching as discussed above with reference to the review creation process. A user may also add new sources to a review by clicking a new source button 322 as shown in the figure. Interface similar to those shown in FIGS. 3F-3I may then be presented to the user.

The publication source list may include characteristic information for each of the sources such as source review progress 324, source name 326, and a source description 328 that includes the number of publications in each source. Each source may have associated therewith a selection box 330 so that actions may be performed on one or more sources. When a selection box 330 is selected, an action menu (not shown) may appear that includes options and functionality including, for example, to merge sources, remove source(s), list publications of the selected source(s), or initiate an analysis of publications in the selected source(s).

The right-hand pane 306 may display review status information and progress. A progress indicator, for example a pie chart 332, may be configured to represent the status of a review by assigning a different claim determination to each colored pie slice. For example, one slice may represent the percentage of publications that have been determined as "clear," another slice may represent the percentage of publications that have been determined as "review file wrapper," and so on for the other available determinations. Since a system in accordance with the present invention may facilitate determinations on a claim-by-claim basis, it may be preferable to normalize the quantities to reflect a number of publications rather than a number of claims. For example, if a publication has 3 claims and only one of them has been determined as "clear" and the other two claims are determined as "need technical info," then such publication will be considered as one third of a publication falling under the "clear" category and two thirds in the "need technical info" category. In this way, the progress indicator represents a function of the number of publications rather than a number of claims. In other embodiments, the quantities may not be normalized such that the statistics represent the number of claims falling into each category rather than a normalized publication quantity. In still other embodiments, both quantities can be displayed so that the user may interpret the data in a manner of their preference.

Right-hand pane 306 may also include a user-supplied stage indicator 334 in order to capture additional information regarding the status of the review.

Patent Review Interface

FIG. 8A shows an exemplary user interface that facilitates a patent analysis step of the present invention. A user may enter this analysis view by clicking on the review button 314 shown in FIG. 6. In that case, the system will retrieve all of the publications that have been added to the review and present them, one-by-one sequentially, in an interface such as that shown in FIG. 8A. Another way to enter the analysis view is to select a source from the source list in pane 304. This action may take the user directly to an analysis view of the publications associated with the particular selected source. The user may alternatively select a selection box 330 of one or more sources, which may then display an action menu, and then the user may choose to review all publications in the selected one or more sources.

Alternatively, the user may choose to initiate analysis of all publications according to determinations that were made with respect to the publications' claims. For example, a user may wish to analyze all publications that include claims for which no determinations have yet been made (i.e., those that have "undetermined" status). The interface shown in FIG. 6 may accomplish this by allowing the user to click on the corresponding slice of the pie chart representing the "undetermined" status. The user may then be presented with the option to either list the corresponding publications or initiate a claim analysis or review. If the user chooses to review the publications, an interface similar to that shown in FIG. 8A may be displayed, with the difference being that the queue of publications to be reviewed is limited to those publications that include claims that have been marked with the selected determination (or, as in the example, those that have yet to be determined).

In one portion of the user interface 400, shown here on the left-hand side, publication details 402 may be displayed. Such publication details may include, for example, bibliographic data such as publication number, title, inventor(s), assignee(s), filing date, priority date, publication date, or any other relevant descriptive information. Publication details may also include status information such as application status (e.g., information extracted from the U.S. Patent Office's Patent Application Information Retrieval (PAIR) a foreign office counterpart, or a third-party information provider), maintenance fee payment status, or expiration status (including whether expiration was a result of non-payment of maintenance feeds, term expiration, or another reason). The publication details area may also include publication content such as an abstract, drawings, or specification. Each item capable of display in the publication details area may be selectively hidden and exposed by default or upon user action, or configured to be permanently visible or invisible.

The user interface also includes a claim text display area. In the embodiment shown in FIG. 8A, the claim text display area 404 is located to the right of the publication details area. In one embodiment, the claim text display area 404 displays only the independent claims of the publication identified in the publication details area. In other embodiments, the claim text display area 404 may include all claims (i.e., independent, dependent, and/or multiply dependent) of the respective publication. Claim text may be retrieved by an application server in communication with one or more patent information databases, as further described with respect to the network architecture below.

Each claim that is listed and displayed in the claim text display area 404 is separately selectable by a user. The user interface may indicate which of the plurality of claims has been selected by for example, highlighting the portion of the display that includes the selected claim. For example, if the claim text display area displays three claims and the user selects claim 1, then the area containing claim 1 may be shaded in a different color than the other claims. The user may use a mouse-controlled cursor or other pointing device to select a different claim from among the plurality of claims, which may result in the different claim being indicated by the designated different color. In other embodiments, it may be possible for the user select one or more claims at the same time.

The user interface includes a further portion, referred to herein as a determination area 406, that is configured to capture analysis, observations, annotations, or predetermined classifiers on a claim-by-claim basis. The term "determination" is used herein solely for reference purposes; it should be recognized by one skilled in the art that the area is not limited to any particular purpose or otherwise limited beyond the reasonable scope of the invention.

The determination area 406 may include sub-portions, each of which corresponds to a respective claim that is listed in the claim text display area. That is, in database, a record will be stored that correlates a particular review, a particular publication with the review, a particular claim within the publication, and data entered in the particular sub-portion by user. When a particular claim in claim text display area 404 is selected, the corresponding determination area 406 sub-portion may be similarly indicated in order to convey to the user which sub-portion is active and correlated to the selected claim, as indicated in FIG. 8A. For example, if the selected claim in claim text display area 404 is indicated by blue-colored shading, the corresponding sub-portion may likewise by shaded in blue while the remainder of the sub-portions are unshaded or hidden, either partially or completely.

The data supplied by a user may include selecting one of a plurality of predefined determinations 408, which may alternatively be referred to as "classifiers," "buckets," "characteristics," "categories," "filters," "actions," "annotations," "statuses," or the like without the intent to limit the scope of the invention. Such determinations may include, for example, any one or more of, but not limited to, "Clear," "Review File Wrapper," "Need Technical Info," "Further Review," "Counsel Review," "Monitor," "Invalidity Position," or "Other." Other determinations may be included as deemed appropriate for the situation. Icons may be placed adjacent to or near each of the predefined determinations to establish an additional visual cue to aid in ease of use. The icons used here preferably match icons used in the publication list view for filtering and other purposes, described further below. In some embodiments, the system includes functionality that enables a user to create new determinations so that they are presented in the determination area sub-portion 406. Users may create new determinations on a per-review basis or on a persistent basis system-wide. Users may also create different sets of determinations and store them as templates so that they can be chosen and applied for use on a per-review basis.

The determinations 408 may represent decisions made by a user with respect to a selected claim. For example, in an embodiment of the invention in which the system is used to perform a product freedom-to-operate analysis, the user may determine that a particular product does not infringe a selected claim (i.e., that the product does not embody all of the claim limitations). In this case, the user may select and click on the predefined determination "Clear" to indicate that the product has cleared the claim (from a patent infringement standpoint). The user may then select another claim from the claim text display area 404, which consequently causes the system to automatically select another sub-portion in the determination area 406, and continue the analysis with respect to the newly selected claim. Depending on the circumstances, the user may select "Clear" as was done for the first claim, or the user may select a different determination from the displayed list. The database is configured to store the selected determination in a manner that correlates it to the selected claim. Moreover, the interface 400 and the list of determinations 408 may be configured to prohibit the user from conjointly selecting more than one determination 408 in association with a single claim (i.e., the determinations are mutually exclusive). This capability may be useful, for example, when the determinations 408 represent status points in a process as described herein.

Figure 8B:

The determination area sub-portion 406 may include further means to capture a user's analysis, such as a comment field 410. As shown in FIGS. 8A and 8B, sub-portion 406 is configured to allow a user to enter text in the field 410. After entering the text and submitting the entry by clicking a button or using the "Enter" key on a keyboard, the comment will be registered in the database and displayed within or near the sub-portion 406. The displayed comment 412, shown in FIG. 8B, may include an avatar, name identifier, time/date stamp or any other characteristics associated with the comment. A menu button associated with an entered comment 412 may allow the user to edit or delete the comment.

Referring again to the claim text display area 404 and FIG. 8B, in some embodiments of the present invention capability is provided to allow a user to highlight portions of the claim text. In one embodiment, highlighting 414 is applied to a portion or all of claim text that is selected by a user with a pointing device. The user may further be provided with the option to select the color of the highlighting 414.

Footnotes or annotations may be further associated with claim text highlighting 414. In one embodiment, a user may have the option of adding a comment upon activating claim text highlighting. After a user selects a portion of the claim text in the interface shown in FIG. 8B, a dialogue window 416, shown in FIG. 9A, may be displayed that provides the user with an entry form. The user may then enter text into the form. The text may serve as a comment or annotation pertaining to the selected claim text, which may be displayed in a portion of the window 416, for example a top portion of the window 416. After submitting the comment, it may be displayed in conjunction with the highlighted claim text 414. For example, as shown in FIG. 8B, the entered comment is displayed in the determination area sub-portion 406 correlated with the claim that contains the selected text. A numerical indicator, e.g., a footnote 418, may be applied to indicate a connection between the highlighted claim text 414 and the user-supplied comment or annotation.

In another embodiment, the user may be provided with predefined comment templates that become available upon selection of particular claim text. As shown in FIG. 9B, the selected claim text may automatically be imported into one or more of a plurality of predefined comment templates 420. Comment templates such as those shown may be useful in establishing consistent behavior among a plurality of users, increasing efficiency throughout the patent review process by reducing the time spent typing, and otherwise implementing uniform policies and best practices.

The patent review interface may also include means for a user to provide their own work product or analysis for storage in the system in connection with the publication itself (in addition to or instead of claim-specific analysis). Referring again to publication details area 402 in FIG. 8A, several icons are provided that represent various data that may be associated with the currently displayed publication. These icons and associated data capture mechanisms may include, for example, a tag icon 422 representing tagging functionality, an attachment icon 424 representing document storage functionality, and a comment icon 426 representing commenting functionality. Each of these functionalities will be described in the following.

Figure 10A:
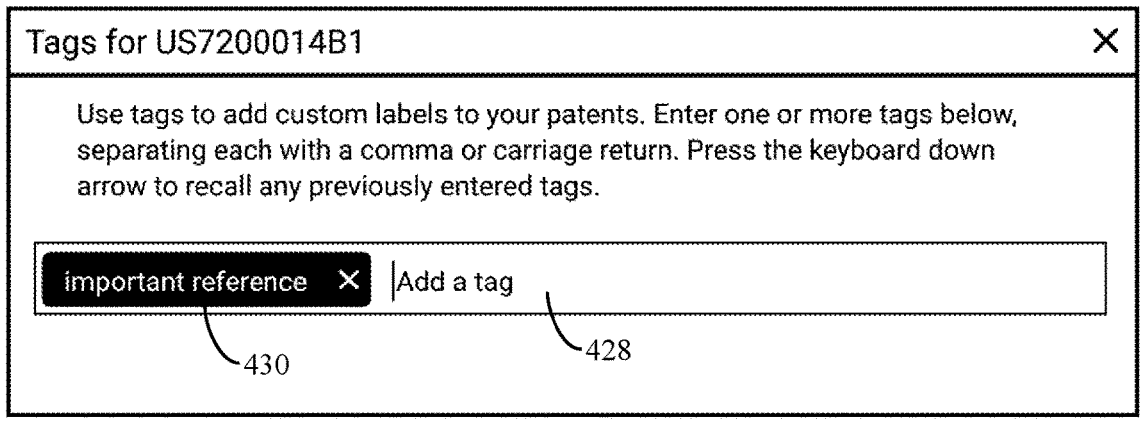
FIGS. 10A-10C illustrate user interfaces in accordance with example embodiments.

Tag icon 422 represents a tagging function. When a user selects the tag icon 422, a pop-up window may be displayed, as shown in FIG. 10A, or other display mechanism to allow the user to enter text to create a new tag or select from previously created tags. A user may create a tag simply by entering text into the field 428 and pressing Enter, Tab, or another submission key on a keyboard or other input device. The user interface will then provide a visual indicator to indicate that the tag has been created and stored. For example, after text is entered and a submission key is pressed, the text may then be surrounded in a color-shaded box 430 as shown. All created tags are stored in a database in connection with the particular publication and in connection with a particular review.

Figure 10B:
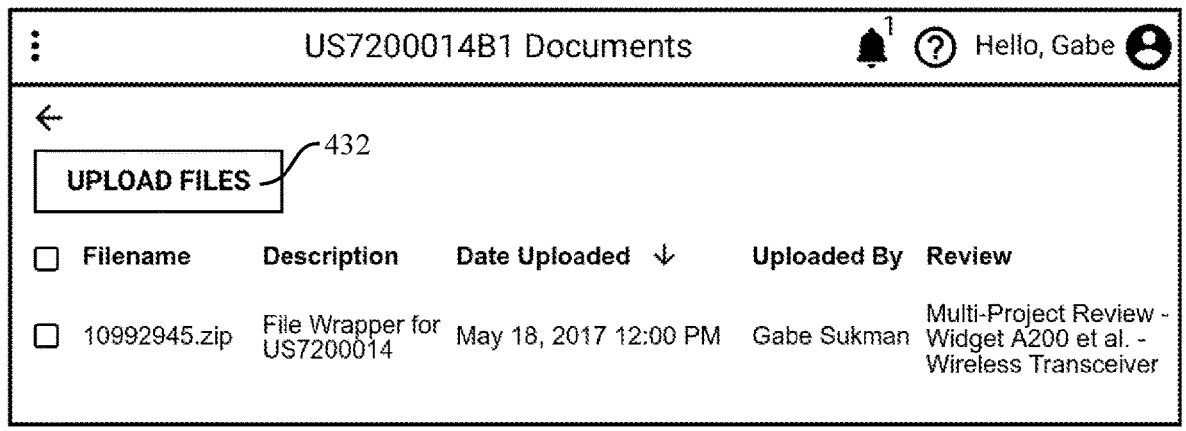

Attachment icon 424 represents a document upload and attachment function. When a user selects the attachment icon 424, a window may be displayed, as shown in FIG. 10B, or other display mechanism to allow the user to upload a new file attachment or select a file from among a list of previously stored files. A user may upload a file by clicking on the upload button 432 and then being prompted to select a file from a location on their local computer. In some embodiments, the user may upload a file from an internet or other network destination using a network address format such as a URL or shared drive folder address. All uploaded documents and files are stored in a database in connection with the particular publication and in connection with a particular review.

Figure 10C:
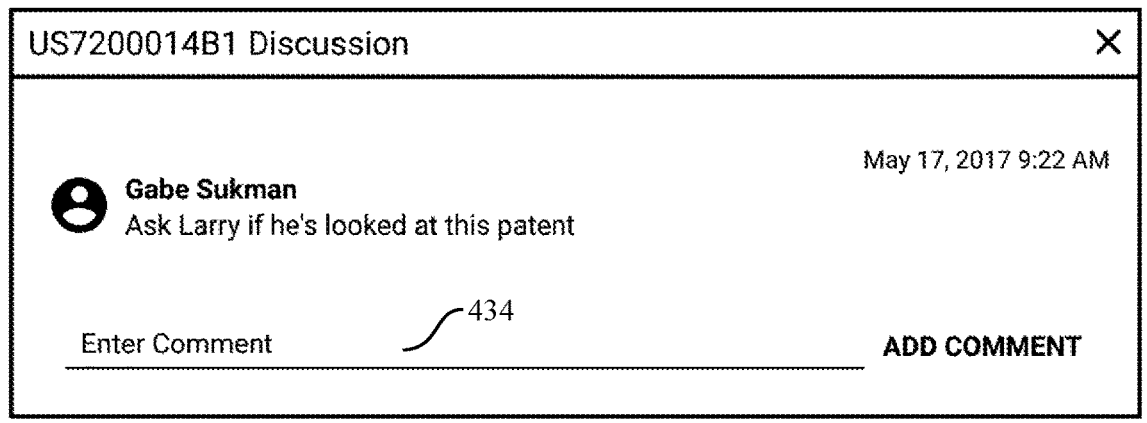

Comment icon 426 represents a publication-level commenting function. Publication-level comments are handled differently from claim-level comments 412 described above in that publication-level comments may be made in connection with the publication as a whole, rather than in connection with a particular claim of the publication. When a user selects the comment icon 426, a pop-up window may be displayed, as shown in FIG. 10C, or other display mechanism to allow the user to enter text to create a new comment. A user may create a comment simply by entering text into the field 434 and pressing Enter, Tab, another submission key on a keyboard or input device, or by clicking a submission button such as the Add Comment button shown. The user interface may then display the submitted comment as shown. The comment may include a user avatar, identifier, and/or timestamp. The interface may further include a menu button (not shown) or dedicated other button to allow a user to edit or delete a comment. In some embodiments, users are only permitted to edit or delete comments that they themselves created, while in other embodiments users are permitted to edit or delete any comment regardless of creator. These modification rights can be configured and delegated among users as desired. All created comments are stored in a database in connection with the particular publication and in connection with a particular review.

The patent review interface may include further functionality to further inform the user about the publication. For example, icon 436 represents a publication download function that, when clicked, enables a user to download the actual official published document underlying the information presented in the interface. The document may be downloaded in a PDF, TIFF, or other suitable file format.

When a user selects the publication download icon, a query is sent to application server. The server then fetches the official document and delivers it to the user terminal. Official publication documents may be stored on an application server, enterprise storage databases, or another database managed by the system administrator. Alternatively or in combination, application server may retrieve the official publication from patent information databases, which may be maintained by a third-party provider or by the system administrator.

Icon 438 may represent a link to further information about the publication represented in display 402. In one embodiment, the icon links to an online patent information resource such as the USPTO Global Dossier. The link may alternatively connect a user to other USPTO webpages or to the webpages of other patent offices, such as those of the European Patent Office (EPO) (e.g., espacenet.com) or Japanese Patent Office (JPO). Additional links and corresponding icons may be provided so that multiple sources are quickly accessible from publication review interface 400.

Figure 11A:
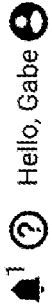

FIGS. 11A and 11B show further enhancements to the publication review interface 400. As shown in FIG. 11A, the review interface includes an additional column, which may be referred to as a products column 440. The entities listed in the products column 440 represent the projects 442, products 444, and aspects (not shown) that were associated with the review during the review creation process described above (or added afterward by means of an editing process). As shown, each product 444 is listed under its respective project 442. A user may expand each product 444 listing by clicking an expansion button, for example arrow 446 to see additional details about the product. Such details may include, for example, a specification of aspects that have been associated with the products. In some embodiments, the expanded details may indicate all of the aspects associated with the product, only the aspects associated with the product that have also been associated with the current review, or a combination of both by indicating aspects that are under consideration in the current review differently from the aspects that are not under consideration.

The product listings 444 may be interactive such that a user may select and deselect one or more of the listed products. A product listing 444 may indicate that it is selected by being shaded with a designated color. This selectivity allows a user to register different determinations with respect to different products in view of a single claim. In the example shown, the user has applied the "clear" determination to the product "Light Saber 200" (with respect to claim 1) and has applied the "need technical info" determination to both products "A200" and "550 Super" (also with respect to claim 1). This mechanism can be applied to the other claims by first selecting the claim, then selecting one or more products 444 to which a determination is to be assigned, and then selecting the desired determination from determination area 406. Then, the products 444 may be deselected and other undetermined products are selected. Then the determination for the other, newly selected product is selected. The determination status for each of the products 444 for each of the claims may be shown in the inactive portion of the determination area 406.

FIG. 11B shows an alternative interface for performing a multiple product review in a manner similar to that described with respect to FIG. 11A. The difference here is that a product selection panel 448 is disposed in the same vertical space as the determination area 406. Here, the user may first select the claim under consideration, then select one or more products 444 to which a determination is to be assigned, and then select the desired determination from the determinations list 408. The user may then select different products from product panel 448 and likewise apply different determinations, and then move on to the next claim.

The more products under consideration and the more claims included in a publication, the more confusing it may get to keep abreast of the statuses of each of the products with respect to each of the claims. Accordingly, it may be helpful to provide a visual aid to illustrate these respective statuses. FIG. 12 shows an example of one way to demonstrate these statuses. As shown, a claim-product matrix provides an intuitive layout to quickly ascertain the respective statuses of each of the products.

List View Interface

FIG. 7 shows an example of a publication list view interface that may be utilized in accordance with the present invention. A user may enter this list view by clicking on the list button 318 shown in FIG. 6. In that case, the system will retrieve all of the publications that have been added to the review and present them in a list such as that shown in FIG. 7. In some embodiments, the list may be paginated so that only a portion of the entire list of publications is shown at once. Another way to enter the list view is to select a source from the source list displayed in pane 304. This action may take the user directly to a list view of the publications associated with the particular selected source. The user may alternatively select a selection box 330 of one or more sources, which may then display an action menu, and then the user may choose to list all publications in the selected one or more sources.

Alternatively, the user may choose to view a list of all publications according to determinations that were made with respect to the publications' claims. For example, a user may wish to list all publications that include claims that were determined as needing counsel review. The interface shown in FIG. 6 may accomplish this by allowing the user to click on the corresponding slice of the pie chart representing the "counsel review" determination. The user may then be presented with the option to either list the corresponding publications or initiate a claim analysis. If the user chooses to list the publications, an interface similar to that shown in FIG. 7 will be displayed, with the difference being that the list is limited to those publications that include claims that have been marked with the selected determination.

Regardless of the particular manner by which a user has arrived at the publication list view interface, the interface may include several functionalities to further increase efficiency, insight, and overall productivity in a patent review process. While the interface shown in FIG. 7 is an example of systems and methods that utilize the present invention, it should be recognized that many departures from this particular arrangement may be made and remain within the scope of the present invention.

Each publication may be listed in its own row, which may contain basic bibliographic information such as publication number 450, title 452, priority date 454, filing date 456, publication date 458, assignee 460, as well as (not shown) inventor(s), classification, maintenance fee status, expiration status, pending status, etc. Each of these fields may be displayed in separate, sortable columns.

In addition to the bibliographic information, additional information may be displayed in relation to each of the publications. This additional information may reflect user work product that has been performed. For example, the left-most column 462 may indicate determinations that were made with respect to each of the publication's claims. Each of the icons may represent a different determination. If all of the claims of a particular publication have been marked with the same determination, then only a single icon would be present in the column. However, if different claims of a single publication were marked with different determinations, then two or more icons may be displayed in the column 462 to represent each of the distinct determinations.

User work product information may also include any tags 464, attachments 466, or comments 468 applied to publications. This information may also be displayed in each publication row. In some embodiments, the tag 464, attachment 466, and comment 468 icons only appear if such information has been provided with respect to the respective publication. For publication that do not have this information applied, the interface may be configured to display the icons upon "hover-over" by a pointing device. The user may add additional information or otherwise modify the work product by clicking on the respective icon. That is, a user may add, remove, or change tags applied to particular publications by clicking on tag icon 464. An interface similar to that shown in FIG. 10A may then be displayed for this purpose. A user may similarly make modifications to document attachments and comments.

Review history icon 470 may represent a publication review history function that inter-relates work product with respect to a single publication across multiple reviews. Review history functionality is discussed in more detail below.

The top portion 472 of the list view interface shown in FIG. 7 may include several filters for managing, searching, or processing the publication list. Starting at the left, the first several icons represent determination filters. Icon 474 may activate and deactivate the determination filters. When user clicks icon 474 the ten icons to the right may be hidden, and then displayed again upon clicking it again in order to preserve space.

The determination icons may be representations for the same determinations that are available in the publication review interface shown in FIG. 8A and include, for example: clear, review file wrapper, need technical info, further review, counsel review, monitor, invalidity position, duplicate claim, other, and undetermined. This is not a definitive list, as determinations may be removed or others added as deemed appropriate. When a user clicks on one of the determination icons, the publication list may be modified to show only those publications that have claims marked with the selected determination. Multiple determination icons may be selected, which may then result in publications being listed that have claims that have either of the selected determinations.

Further filters include a tag inclusion filter 476 and a tag exclusion filter 478. Entering a tag in the tag inclusion filter 476 may result in displaying only those publications that have been tagged with the entered tag. Entering a tag in the tag exclusion filter 478 may result in displaying all publications except those publication that have been tagged with the entered tag.

List interface may also include a comment filter. After clicking on the comment icon 480, a user may enter text into a text field. The list may then be modified to display only publications that have comments, either on the publication level or the claim level, that include the entered text. Alternatively, a user may be permitted to select whether to search publication level comments, claim level comments, or both.

List interface may also include a bibliographic data filter. After clicking the bibliographic data icon 482, the user may enter text into a text field. The list may then be modified to display only publications that have bibliographic data that matches the entered text.

In multiple-product reviews, a further filter may be provided to allow the user to select one or more of the associated products. The impact of this filter selection will affect the determination icons that are shown in the left-hand column. That is, the determinations that are shown will reflect only the determinations made with respect to the selected product(s) in the product filter.

Clicking on the row of a publication in the list view shown in FIG. 7 may allow a user to enter a publication review interface such as that shown in FIG. 8A.

Inter-Relations Between Record Entities

A significant advantage of the present invention is the ability to leverage work product across many different projects or patent reviews. In many industries, innovators working on particular technology will come across the same, similar, or related publications many times over the course of business. Systems and methods for facilitating and capturing patent analysis in accordance with the present invention harness the power of inter-related records, databases, and new workflows in order to significantly increase the efficiency of most patent review projects. The present invention also gives users ready access to insights and observations by surfacing prior work product in way that is not available in conventional systems.

Local and Global Tags and Comments

One way that the present invention surfaces historical work product is through additional functionality built into the tagging and commenting functionality described above. In addition to using tags and comments to organize, categorize, manage, flag, annotate, and otherwise capture analysis and observations within a single publication review, the present invention provides further capability for tags and comments to operate simultaneously across multiple reviews. This functionality is especially helpful in all sorts of patent document analysis because it allows users to leverage analysis that was made in prior reviews, such as when prior products are similar to current products under investigation or when the same publications are associated with different reviews, while also functioning on a local review level for filtering or otherwise characterizing publications. For example, when performing a product freedom-to-operate analysis with respect to a set of patents, it is helpful to know whether a particular patent publication has been reviewed in the past, even if that review was made with respect to a different product, and what determinations or observations were made at that point. Activities such as file history review, litigation analysis, technical analysis, ownership investigations, research, etc., can be very time consuming. If any of that effort was made in earlier reviews and captured using tags or comments, significant time savings can be achieved in a current review by quickly revisiting that prior work product using the dual local/global functionality described herein.

Tags and comments may be indicated differently depending on the reviews with which they are directly associated in order to convey to a user whether the tag or comment is local or not. As used herein, "local tag" and "local comment" are relative terms that refer to a tag and comment, respectively, that is or was created by a user in a current review (i.e., the review that is currently active or open in the user interface). This is distinct from a tag or comment that was created by a user in another review (i.e., a review other than that which is currently active or open in the user interface).

Tags and comments may be represented in at least three different configurations to indicate to the user the local or global status of tags or comments in the context of a particular active review. One way to represent different tag statuses is by using different colors, shading, patterns, or by textual indicia, all of which are contemplated by the present invention. For example, with reference to FIG. 8A, if one or more tags have been applied to a displayed publication in the current review, the tag icon 422 may have a blue color, for example. If one or more tags has been applied to the displayed publication in another review but not the current review, the tag icon 422 may instead have an orange color, for example. If one or more tags have been applied to the displayed publication in both the current review and another review, the tag icon 422 may have a purple color, for example. Each of these indications convey different information to the user about whether tags have been to the displayed publication and also whether they have been applied (i) in the current review; (ii) a different review, or (iii) both the current review and another review.

The same color scheme can likewise be applied to the comment icon 426 to indicate whether one or more comments have been applied to the displayed publication (i) in the current review; (ii) a different review, or (iii) both the current review and another review. Similarly, this color scheme can be applied to the attachment icon 424 to indicate whether one or more files have been attached or uploaded to the displayed publication (i) in the current review; (ii) a different review, or (iii) both the current review and another review.

If a user clicks on a tag icon 422 that indicates that a tag has been applied to the displayed publication in another review, a pop-up window 484 or other display mechanism may be displayed that shows the particular tags that have been applied, as shown in FIG. 13A. As shown, the left-hand side 486 displays the tags that have been applied in the current review, while the right-hand side 488 displays tags that were applied to the same publication in different reviews. Each of the other reviews in which the tag has been applied can be identified by a review identifier, name, and/or description, and the particular tags that were applied are correspondingly shown along with the review information.

Similarly, with reference to FIG. 8A, if a user clicks on a comment icon 426 that indicates that a comment has been applied to the displayed publication in another review, a pop-up window 490 or other display mechanism may be displayed that shows the particular comments that have been applied, as shown in FIG. 13B. As shown, the left-hand side 492 displays the comments that have been applied in the current review, while the right-hand side 494 displays comments that were applied to the same publication in different reviews. Each of the other reviews in which a comment has been applied can be identified by a review identifier, name, and/or description, and the particular comments that were applied are correspondingly shown along with the review information. A similar mechanism may be used to indicate documents that have been attached in the current and/or other reviews.

Review History

Figure 14:
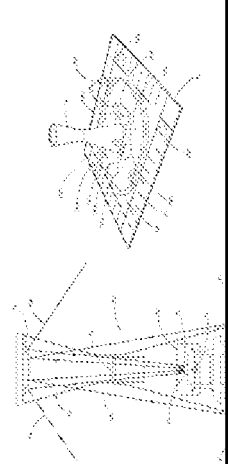
FIG. 14 illustrates a user interface in accordance with one example embodiment.

Another powerful way to increase efficiency and insight in the patent review process in accordance with the present invention is to generate an interactive publication review history interface using inter-connected records such as that shown in FIG. 14. As used herein, a "publication review history" or "review history" refers to work product that was created and stored with respect to a particular publication across all associated reviews. This includes, for example, any tags, comments, documents, claim determinations, claim comments, text highlighting, or any other information stored in association with the particular publication. The review history interface is presented based on querying one or more application databases and gathering the previously stored work product.

FIG. 14 illustrates an exemplary review history interface in accordance with an embodiment of the present invention. In the left-hand pane 496 of the display, there is shown bibliographic and basic publication information such as publication number, title, inventor(s), assignee, priority date, filing date, publication date, actual or estimated expiration date, maintenance fee status, status date, and abstract. Although not shown, other publication information may similarly be displayed. If the publication is an application publication and the application is still pending, then additional information may include an application status (e.g., PAIR status). The pane 496 may also include one or more drawings taken from either the face or the contents of the actual publication document.

Pane 496 may also include icons in a similar manner as those in patent review interface 400, such as tags 498, attachments 500, comments 502, document download 504, and external links 506.

The top-right pane 508 lists all of the reviews in which the particular publication has been added. The reviews may be listed in table format in a manner that resembles the review listing shown in FIG. 4. The review listing may include fields such as, for example, review ID, due date, projects, products, aspects, description, date created, a status indicator, document count, comment count, and/or tag count. A button 510 may also be provided for allowing the user to jump directly to the review. In one embodiment, when a user clicks the button 510 in association with one of the reviews listed in the list 508, a new browser tab is initiated and the application presents the subject publication in a patent review interface in the context of the selected review.

Lower-right hand pane 512 displays the work product relevant to the subject publication, in the context of the review that is selected in list 508. The user can switch between any one of a plurality of reviews that are listed in the list 508 by clicking its row in order to view the associated work product. For example, in FIG. 14 the review having review ID "SF-9600" is selected (as indicated by the shaded row). Accordingly, pane 512 displays the work product associated therewith.

Pane 512 may include a plurality of tabs, each of which is selectable to display the various work product. Determinations tab 514 is shown as selected in FIG. 14. When determinations tab 514 is selected the lower display may resemble a summary version of a claim text area 522 and determination area 524. These areas resemble the corresponding claim text area 404 and determination area 406 in patent review interface 400 and are configured to display congruent information. This information may include claim determinations as well as claim comments, as shown. The claim text area 522 may also display any claim text highlighting and corresponding annotations that were entered by a user in the selected review in a manner similar that shown and described with respect to FIG. 8B.

When a user selects the document tab 516, the pane 512 may display a list of documents that have been attached or uploaded to the publication as part of the selected review. The display (not shown) may be similar to that shown in FIG. 10B. Functionality is preferably provided to enable a user to view or download any listed documents directly from the review history interface.

When a user selects the comments tab 518, the pane 512 may display any comments that have been created with respect to the publication in the selected review. The display (not shown) may be similar to that shown in FIG. 10C or 13B.

When a user selects the tags tab 520, the pane 512 may display any tags that have been created with respect to the publication in the selected review. The display (not shown) may be similar to that shown in FIG. 10A or 13A.

Users may open the review history interface shown in FIG. 14 by clicking on an icon or menu option that is associated with a particular publication. For example, in FIG. 7, clicking on icon 470 commands the system to open the review history interface. Alternatively, the review history interface may be activated by selecting a menu button and further selecting an option for opening the review history. Each publication may consequently have its own icon 470 for accessing its review history. While the icon 470 is visibly shown in relation to each of the publication listed in FIG. 7, in other embodiments the icon may be hidden for any publications that do not have any review history. In other words, in such embodiments, the icon 470 may be shown for a particular publication only if that publication was previously added to another review (in addition to the current review). In other embodiments, the icon 470 may be shown for a particular publication only if that publication was previously added to another review and work product was created with respect to that publication. Using one of these selective icon display methods, a user may be quickly alerted as to whether a publication has been associated with any prior reviews. A user may alternatively access the review history interface from the publication review interface 400 shown in FIG. 8A by clicking on icon 526.

In application in accordance with an embodiment of the present invention may include functionality for searching for publication work product across all stored reviews. This function may be accessible from the navigation column 230 by clicking on a link, such as patent finder 574, as shown in FIG. 2.

FIG. 15 shows an example of a results list after using the patent finder functionality. The user is able to use a variety of filters or search functions to extract desired publications across all those that have been entered into the application as part of a review. For example, by using the Quick Lookup function 576, the user can enter a publication number, or part thereof, as a search query. The interface 572 will then return all results that are responsive to the query. For more advanced search functionality, the user may click on the global filter tab 578 and apply queries to search by determinations 580, tags 582, comments 584, publication number 586, or bibliographic information (not shown).

In FIG. 15, the user searched across all reviews based on applying the determination filter "Need Technical Info." Specifically, the user selected the Need Technical Info icon 588 from among displayed determination icons in order to search for all publications for which the determination "Need Technical Info" had been applied. As indicated, 51 results have been identified, and each publication is listed in listing 590 along with the number of reviews with which each publication has been associated. Clicking on a publication row will open a review history interface for the selected publication, such as that shown in FIG. 14.

This system-wide search functionality is a powerful mechanism to quickly look up the work product associated with particular publications that have been entered into the system. Whether searching by publication number or work product aspects such as determinations, tags, or comments, this functionality enables the user to quickly locate historical work and analysis. Conventional systems typically involve work product that is scattered in different locations, accessible by limited individuals, or is otherwise cumbersome to locate.

Project Management

A further significant advantage of systems and methods in accordance with the present invention is the ability to connect patent reviews with particular projects, products, and aspects in a meaningful, functional, and intuitive way. While simply identifying these entities in conjunction with reviews goes a long way in managing reviews so that prior work can be memorialized and leveraged, further advantages can be realized by virtue of a structured system for storing, organizing, and interacting with projects, products, and reviews. While much of this discussion is directed to the various interfaces that facilitate and enable the user's experience, it should be recognized that the back-end data management, inter-relations, and data transmission likewise represent the novel and non-obvious aspects of the present invention.

Referring back to the dashboard shown in FIG. 2, a user may access a project management module by clicking on the projects button 528 in the navigation bar 230. An example interface suitable for project management is shown in FIGS. 16A-D.

As shown, project names may be listed in column 530, while project information is listed on the right-hand side 532. The information shown on the right represents the project that is actively selected from the list 530. The actively selected project may be indicated by a circle or other suitable indicator. Project information may include project name, due date, description, assigned analysts, and assigned attorneys. The lower right-hand portion 532 of the display may include comments entered by users in relation to the project.

Further information may include documents or files that have been attached to the selected project. This information may be accessed by selecting a documents button 536 to toggle over to a document listing and upload page (not shown).

A user may also view all of the reviews that have been associated with a selected project by clicking a review tab 538. As shown in FIG. 16B, the interface will then look up and retrieve from a database all reviews connected with the selected product and display them in the area 540. The review information displayed here may be similar to that displayed in the review module shown in FIG. 4. Clicking on a particular review in the listing 540 may take the user to that review's detail page, similar to that shown in FIG. 6.

New project icon 542 may be selected to create and store a new project in the database. Upon clicking the icon, a display may be presented to prompt the user to enter descriptive information about the project, such as the information shown in the overview pane in FIG. 16A. A menu may be provided in relation to each of the projects in order to perform one or more actions, such as editing the project, deleting the project, adding a product under the project, or initiating the creation of a new patent review associated with the selected project.

Products may be created and stored relationally under a project. As shown, for example, products "Light Saber 200" and "New Product" are organized as products under the higher-level project "Jedi Tools." Products may be added, edited, or deleted by selecting an action from a menu.

Figure 16A:
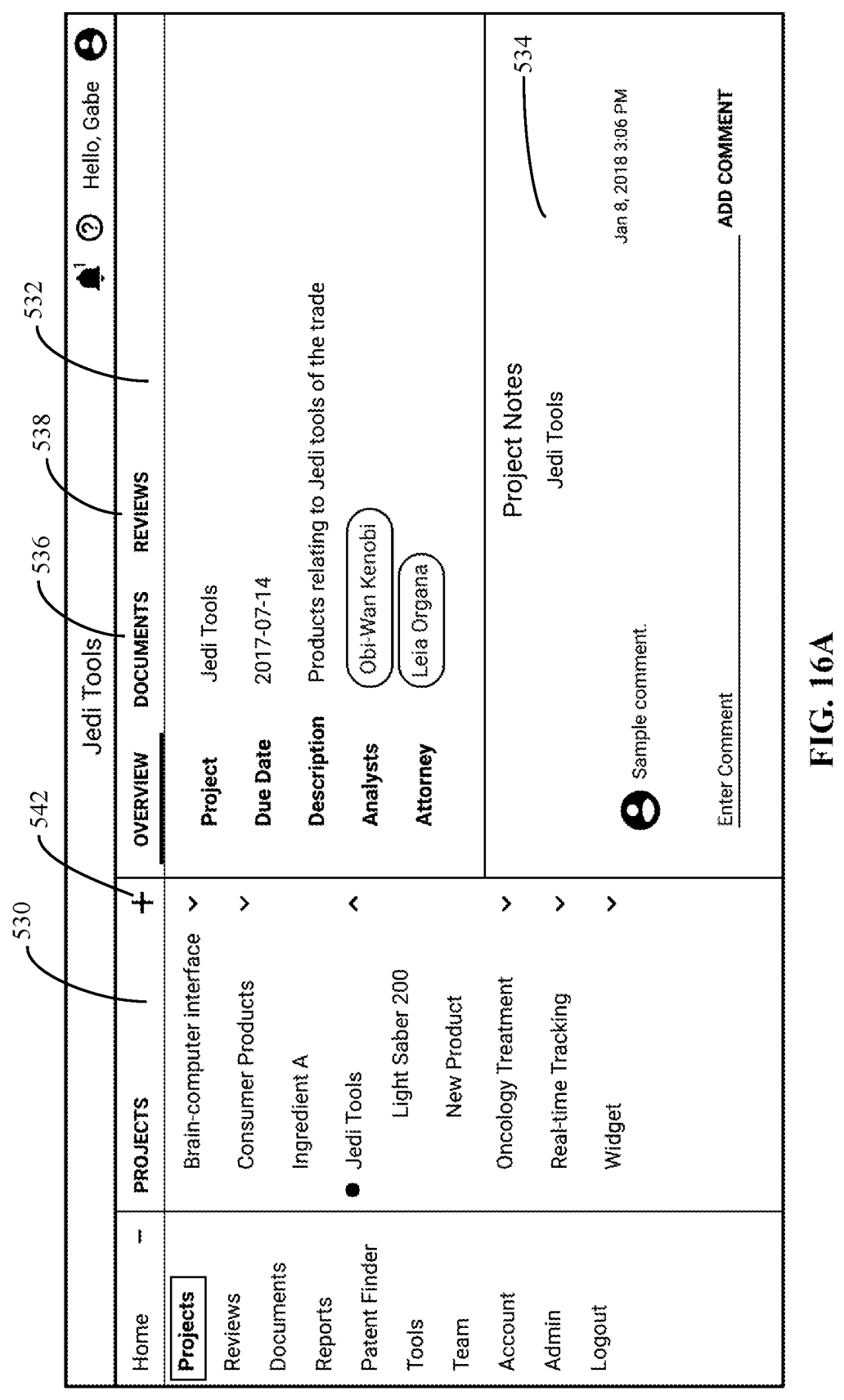
Figure 16C:
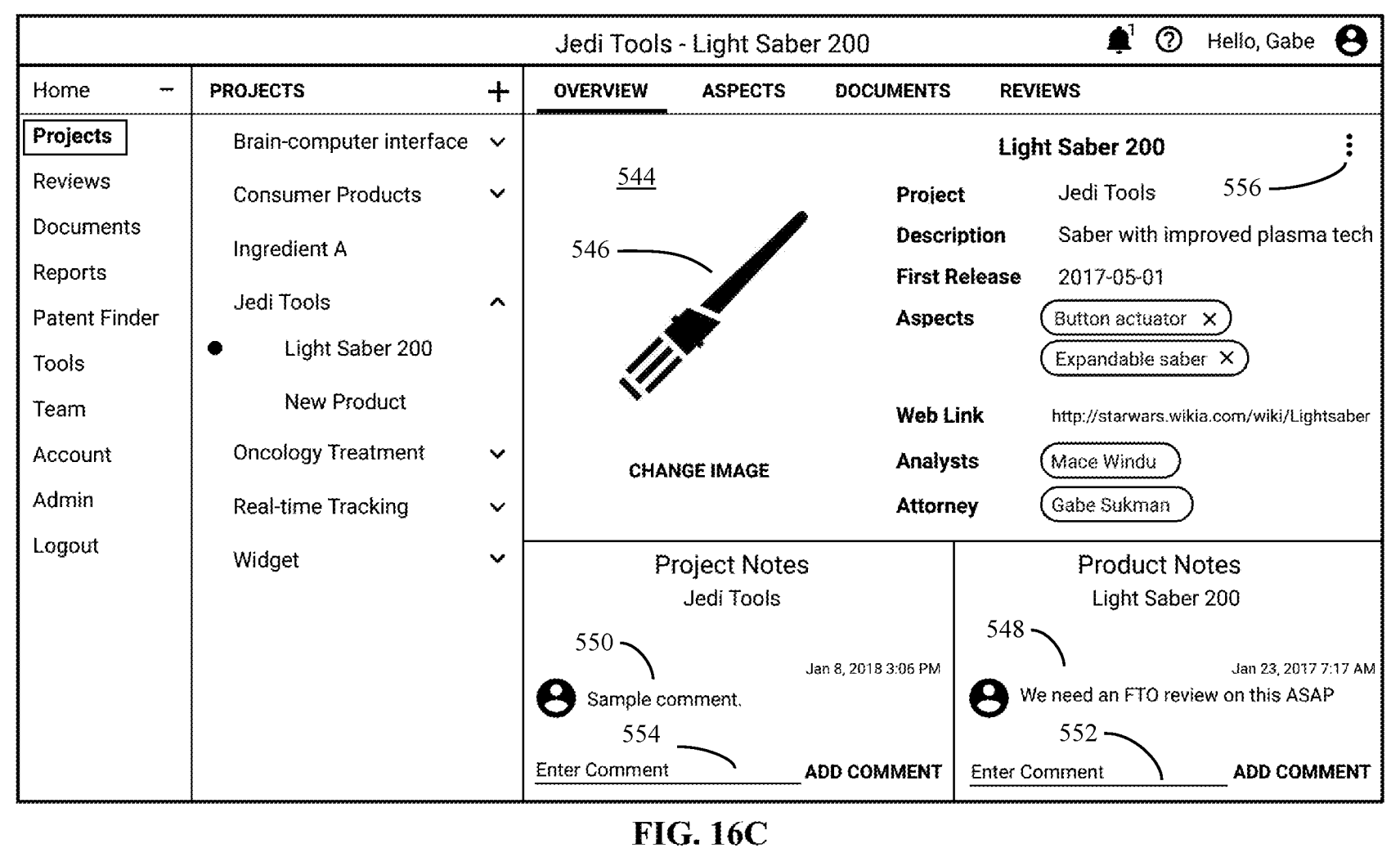

FIG. 16C shows a product overview display 544 relative to the selected example product "Light Saber 200." As shown, the product may include descriptive information such as name, project, description, date of first release, aspects, internet links, assigned analysts, and assigned attorneys. The product information may further include one or more images 546 that may be uploaded by a user.

Product overview display may also show comments that were made with respect to the product itself 548 as well as project comments 550. Users may also enter new comments in the spaces 552, 554 or edit or delete existing comments.

Action menu 556 may be provided to enable a user to perform one or more actions with respect to a selected product. Such actions may include editing or deleting a product, changing its business status, or initiating the creation of a new review associated with the selected product.

Products can be further delineated by defining particular features or, as referred to herein, "aspects," as shown in FIG. 16D. These aspects can also be associated with particular patent reviews during the review creation process in order to provide further definition of the review. In some embodiments, a restriction may be imposed that prevents a user from associating an aspect with a review if the product containing the aspect is not also associated with the review. This is a practical rule that may be applied because, in certain activities (such as clearance or freedom-to-operate), it would be improper to consider infringement liability of an aspect without regard to the product in which it resides. In other embodiments, however, this limitation may not be imposed so that a user is provided with maximum flexibility despite potential errors in some use cases.

Aspects may have descriptive information similar to that of products. As shown in aspect details area 558 in FIG. 16D, an aspect may include an aspect name, description, date of first release, products it is in, internet link, and its business status. Users may also upload images 560 and documents 562 to provide further information about the aspect. Aspect-specific comments 564 may also be provided.

Aspect records may be configured such that they may be associated with a plurality of different products, which may also cover different projects. The purpose of this is because various different products may in fact contain common aspects. For example, two different cars may be using the same engine or airbag inflator. Thus, utilizing systems and methods of the present invention would allow a patent analyst to easily and quickly leverage analysis that was performed on a particular product feature (i.e., aspect) even when that feature is being implemented in a different product. That is, if an analyst has performed a freedom-to-operate investigation with respect to an airbag inflator when it was installed in car model A, the analyst will be able to leverage that prior analysis when the airbag inflator is installed in car model B. This capability is nearly impossible or, at best, extremely cumbersome to do with conventional methods.

Action menu 566 may be provided to enable a user to perform one or more actions with respect to a selected aspect. Such actions may include editing or deleting an aspect, changing its business status, or initiating the creation of a new review associated with the selected aspect.

FIG. 17 shows an alternative arrangement for a project management module in accordance with the present invention. In this display, project information is arranged in rows, and interactive functionality such as project attachments and comments are accessible for each project in its respective row.

Each project row is expandable to display respective tables for products or associated reviews, each of which likewise includes functionality for attachments, comments, and image upload (for products), as shown in interface 568. Reviews listed in the review tables may be accessed by clicking on the respective row.

The project management module may be searchable to find data records containing particular words or phrases using search function 570. The user may select one or more fields in which to perform the search, such as project name, project description, product name, product description, analyst, attorney, etc.

System Architecture

Figure 18:
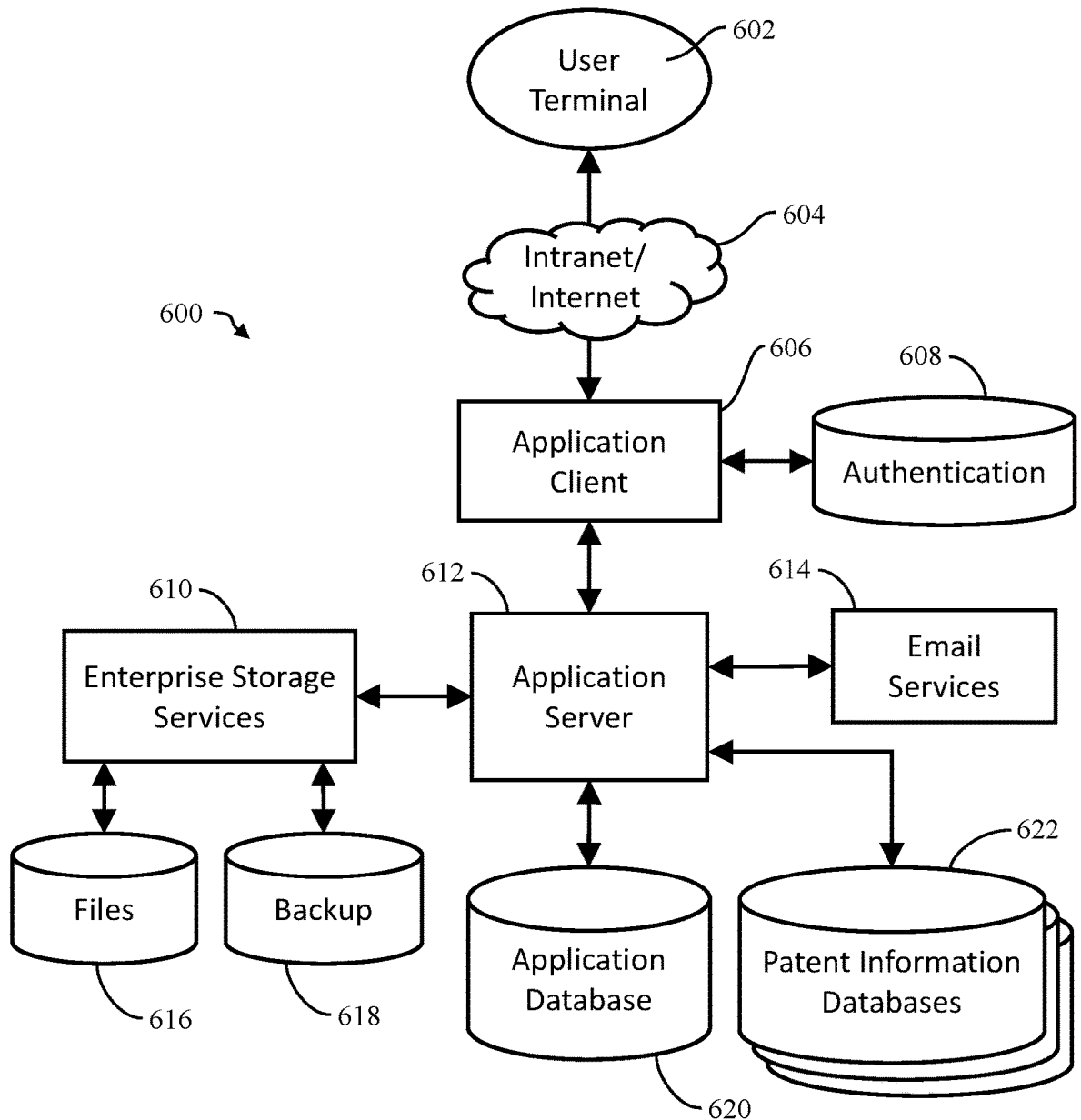
FIG. 18 is a system schematic diagram in accordance with one example embodiment.

Referring to FIG. 18, a general architecture 600 of a system in accordance with the present invention is shown. A user terminal 602 may be any electronic device configured to communicate with another device via a network 604, such as a local area network, an intranet, or the internet, by either wired or wireless communication. The user terminal 602 includes one or more input devices such as a mouse, touchpad, keyboard, or other device known in the art. The user terminal also includes a display device that enables the presentation of a graphical user interface to the user. In embodiments of the present invention, the user terminal accesses the application client through the network by using an internet browsing application such as Google Chrome, Mozilla Firefox, Microsoft Internet Explorer, Microsoft Edge, Apple Safari, or any other network browser.

The application client 606 is a processing component that has source code stored thereon for implementing front-end client processing. The application client 606 may be responsible for processing and presenting the graphical user interfaces described herein to the user, receiving user inputs, communicating with application server 612 for data processing, and outputting resulting information to the user terminal 602 for subsequent display thereon. The application client 606 communicates with an authentication database 608, either integrated therewith or via network connection, in order to authenticate users based on a combination of credentials. User credentials may include one or more of a username, password, biometric data, two-factor authentication information or other information known in the art for authenticating users in a secure manner. The application client 606 may communicate with an application server 612 for back end processing.

The application server 612 communicates with the application client 606 and one or more additional back end processing components and storage devices as shown in FIG. 18. Email services component 614 facilitates email or other electronic communications (e.g., text messages, social media messaging, or other messaging) with users based on application events. The application may be configured to transmit messages to users based on predefined rules, events, activities, or notifications.

Application server 612 may communicate with one or more patent information databases 622 in order to retrieve patent information and data in response to user activity. Such data may include raw or curated patent bibliographic data, patent publication documents and images, full text character files, OCR text, patent assignment information, maintenance fee information, appeal data, litigation data, licensing information, or any other patent related information known in the art. Patent data may also include value added information such as classification information, annotation information, and other information created by applying particular analysis. The data may be stored in any form known in the art, such as XML, PDF, TIFF, JSON, ZIP, including likes and equivalents. Patent information databases may be stored within a local server environment or an externally-hosted environment, and may be managed by the application provider, a third-party database provider, a government official patent office, or another entity.

Application server 612 may also communicate with one or more application databases 620 in order to store and retrieve user-specific information in furtherance of the benefits of the present invention. Application database 620 may store records created by the user of a system in accordance with the present invention. Such records may include information relating to projects, products, aspects, and reviews created by the user such as document attachments, images, and the like. Stored records may also include any work product or analysis provided by the user. Work product may include comments, tags, patent attachments, claim determinations, history, or any other user-provided information. The application server 612 transmits information to the application database 620 based on directives and functionality operable by action at user terminal 602, and retrieves information based on user requests. The application server 612 may also be configured to store and retrieve information from application database 620 based on automated processing without user initiation or involvement.

Application server 612 may communicate with further storage systems, through enterprise storage services 610, in order to facilitate or enable a dedicated file storage database 616 and/or backup storage 618. Enterprise storage services 610, file database 616, and backup storage 618 may be used as necessary or, optionally, not at all, depending upon the needs of a system in accordance with the present invention in consideration of storage size limits, security, processing efficiency, cost effectiveness, etc.

While described as a single processing component, each component described herein may actually implemented by one or more separate components without departing from the spirit of the invention. Moreover, one, several, or all of the components indicated downstream of the internet connection (relative to the user terminal) may be disposed in a single processing component or server environment as deemed suitable by one skilled in the art without limitation. Alternatively, the application client 606 may be installed on a user terminal 602 or other connected device before connecting to the application server 612 through the internet 604 or other network. In some embodiments, the entire system shown in FIG. 18 is installed in a local environment without any access to the internet or other external components. In still other embodiments, one or more processing components shown in FIG. 18 is disposed externally while the remainder is installed locally. Any such configurations are within the scope of the present invention and are not limited beyond that which is recited in the appended claims.

While various features have been described in conjunction with the examples outlined above, various alternatives, modifications, variations, and/or improvements of those features and/or examples may be possible. The particular order of method steps described herein is not intended to be limiting, as steps may be re-ordered or omitted while remaining within the spirit of the invention. Accordingly, the examples, as set forth above, are intended to be only illustrative. Various changes may be made without departing from the broad spirit and scope of the underlying principles.

What is claimed is:

1. A computer-implemented method of managing claim-based patent analysis comprising the steps of:
   storing a product record in a computer-readable database, in response to one or more user inputs, wherein the product record includes a plurality of data fields that pertain to product subject matter of claim-based patent analysis, wherein one of the data fields is a product identifier;
   storing an aspect record in a computer-readable database, in response to one or more user inputs, wherein the aspect record is programmatically connected to at least one product record so as to represent the notion that the connected aspect record represents an aspect of the product subject matter of claim-based patent analysis, and wherein the aspect record includes a plurality of data fields, and wherein one of the data fields is an aspect identifier;
   storing a review record in a computer-readable database, in response to one or more user inputs, wherein the review record is a collection of stored data comprising (i) a review identifier, (ii) a product identifier corresponding to a stored product record, (iii) an aspect identifier corresponding to a stored aspect record, (iv) a plurality of patent document identifiers, and (v) user-provided work product that represents, at least in part, claim-based patent analysis performed with respect to particular patent documents represented by the plurality of patent document identifiers contained in the review record,
   wherein a particular aspect record is programmatically connected to both a first product record and a second product record, and wherein the first product record and the particular aspect record are associated with a first review record, and the second product record and the particular aspect record are associated with a second review record, thereby providing two review records that are each associated with the same aspect record but not the same product record.

2. The computer-implemented method of claim 1, further comprising:
   storing a further review record in a computer-readable database, in response to one or more user inputs, wherein the further review record is a collection of stored data comprising (i) a review identifier, (ii) a plurality of product identifiers respectively corresponding to a plurality of stored product records, (iii) a plurality of patent document identifiers, and (iii) user-provided work product that represents, at least in part, claim-based patent analysis performed with respect to particular patent documents represented by the plurality of patent document identifiers contained in the further review record,
   wherein the user-engageable patent review interface is configured to capture different determinations for each of the plurality of product records.

3. The computer-implemented method of claim 1, wherein the stored work-product comprises a portion of claim text that has been selected and highlighted by a user.

4. The computer-implemented method of claim 1, further comprising the step of retrieving in a filtered list, in response to a user input, all review records that are associated with a particular aspect record.

5. The computer-implemented method of claim 1, wherein the aspect record represents a component of the product subject matter that is represented by the product record to which the aspect record is connected.

6. The computer-implemented method of claim 1, wherein the aspect record represents a material property of the product subject matter that is represented by the product record to which the aspect record is connected.

7. The computer-implemented method of claim 1, wherein the aspect record represents a technical characteristic of the product subject matter that is represented by the product record to which the aspect record is connected.

8. A program stored on a non-transitory computer-readable medium that when executed by a computing device performs a method comprising the steps of:
    storing a product record in a computer-readable database, in response to one or more user inputs, wherein the product record includes a plurality of data fields that pertain to product subject matter of claim-based patent analysis, wherein one of the data fields is a product identifier;
    storing an aspect record in a computer-readable database, in response to one or more user inputs, wherein the aspect record is programmatically connected to at least one product record so as to represent the notion that the connected aspect record represents an aspect of the product subject matter of claim-based patent analysis, and wherein the aspect record includes a plurality of data fields, and wherein one of the data fields is an aspect identifier;
    storing a review record in a computer-readable database, in response to one or more user inputs, wherein the review record is a collection of stored data comprising (i) a review identifier, (ii) a product identifier corresponding to a stored product record, (iii) an aspect identifier corresponding to a stored aspect record, (iv) a plurality of patent document identifiers, and (v) user-provided work product that represents, at least in part, claim-based patent analysis performed with respect to particular patent documents represented by the plurality of patent document identifiers contained in the review record,
    wherein a particular aspect record is programmatically connected to both a first product record and a second product record, and wherein the first product record and the particular aspect record are associated with a first review record, and the second product record and the particular aspect record are associated with a second review record, thereby providing two review records that are each associated with the same aspect record but not the same product record.

9. The program of claim 8, that performs a method further comprising the steps of:
    storing a further review record in a computer-readable database, in response to one or more user inputs, wherein the further review record is a collection of stored data comprising (i) a review identifier, (ii) a plurality of product identifiers respectively corresponding to a plurality of stored product records, (iii) a plurality of patent document identifiers, and (iii) user-provided work product that represents, at least in part, claim-based patent analysis performed with respect to particular patent documents represented by the plurality of patent document identifiers contained in the further review record,
    wherein the user-engageable patent review interface is configured to capture different determinations for each of the plurality of product records.

10. The program of claim 8, wherein the stored work-product comprises a portion of claim text that has been selected and highlighted by a user.

11. The program of claim 8, that performs a method further comprising the step of retrieving in a filtered list, in response to a user input, all review records that are associated with a particular aspect record.

12. The program of claim 8, wherein the aspect record represents a component of the product subject matter that is represented by the product record to which the aspect record is connected.

13. The program of claim 8, wherein the aspect record represents a material property of the product subject matter that is represented by the product record to which the aspect record is connected.

14. The program of claim 8, wherein the aspect record represents a technical characteristic of the product subject matter that is represented by the product record to which the aspect record is connected.

15. A system comprising one or more processors configured to control:
    a storage module configured to store a product record in a computer-readable database, in response to one or more user inputs, wherein the product record includes a plurality of data fields that pertain to product subject matter of claim-based patent analysis, wherein one of the data fields is a product identifier;
    a storage module configured to store an aspect record in a computer-readable database, in response to one or more user inputs, wherein the aspect record is programmatically connected to at least one product record so as to represent the notion that the connected aspect record represents an aspect of the product subject matter of claim-based patent analysis, and wherein the aspect record includes a plurality of data fields, and wherein one of the data fields is an aspect identifier;
    a storage module configured to store a review record in a computer-readable database, in response to one or more user inputs, wherein the review record is a collection of stored data comprising (i) a review identifier, (ii) a product identifier corresponding to a stored product record, (iii) an aspect identifier corresponding to a stored aspect record, (iv) a plurality of patent document identifiers, and (v) user-provided work product that represents, at least in part, claim-based patent analysis performed with respect to particular patent documents represented by the plurality of patent document identifiers contained in the review record,
    wherein a particular aspect record is programmatically connected to both a first product record and a second product record, and wherein the first product record and the particular aspect record are associated with a first review record, and the second product record and the particular aspect record are associated with a second review record, thereby providing two review records that are each associated with the same aspect record but not the same product record.

16. The system of claim 15, that performs a method further comprising the steps of:
    storing a further review record in a computer-readable database, in response to one or more user inputs, wherein the further review record is a collection of stored data comprising (i) a review identifier, (ii) a plurality of product identifiers respectively corresponding to a plurality of stored product records, (iii) a plurality of patent document identifiers, and (iii) user-provided work product that represents, at least in part, claim-based patent analysis performed with respect to particular patent documents represented by the plurality of patent document identifiers contained in the further review record, wherein the user-engageable patent review interface is configured to capture different determinations for each of the plurality of product records.

17. The program of claim 15, wherein the stored work-product comprises a portion of claim text that has been selected and highlighted by a user.

18. The program of claim 15, that performs a method further comprising the step of retrieving in a filtered list, in response to a user input, all review records that are associated with a particular aspect record.

19. The program of claim 15, wherein the aspect record represents a component of the product subject matter that is represented by the product record to which the aspect record is connected.

20. The program of claim 15, wherein the aspect record represents a technical characteristic of the product subject matter that is represented by the product record to which the aspect record is connected.

\* \* \* \* \*